US009092805B2

(12) United States Patent
Dittus

(10) Patent No.: US 9,092,805 B2
(45) Date of Patent: *Jul. 28, 2015

(54) TARGETING ONLINE ADS BASED ON POLITICAL DEMOGRAPHICS

(71) Applicant: Audience Partners LLC, Fort Washington, PA (US)

(72) Inventor: Jeffrey A. Dittus, Penn Valley, PA (US)

(73) Assignee: Audience Partners, LLC, Fort Washington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,637

(22) Filed: Jun. 2, 2014

(65) Prior Publication Data
US 2014/0278980 A1 Sep. 18, 2014

Related U.S. Application Data

(63) Continuation of application No. 13/593,281, filed on Aug. 23, 2012, now Pat. No. 8,763,033.

(60) Provisional application No. 61/526,413, filed on Aug. 23, 2011.

(51) Int. Cl.
| H04N 7/10 | (2006.01) |
| G06Q 30/02 | (2012.01) |
| H04N 21/2668 | (2011.01) |
| H04N 21/475 | (2011.01) |
| H04N 21/81 | (2011.01) |

(52) U.S. Cl.
CPC ............ *G06Q 30/0269* (2013.01); *G06Q 30/02* (2013.01); *G06Q 30/0255* (2013.01); *H04N 21/2668* (2013.01); *H04N 21/4758* (2013.01); *H04N 21/812* (2013.01)

(58) Field of Classification Search
CPC .......................... H04N 21/812; H04N 21/4532
USPC ............................... 725/32–36; 709/217–232
See application file for complete search history.

(56) References Cited

U.S. PATENT DOCUMENTS 5,740,549 A * 4/1998 Reilly et al. ................ 705/14.42
5,757,917 A * 5/1998 Rose et al. ....................... 705/79

(Continued)

OTHER PUBLICATIONS

Howard, "Digitizing the Social Contract: Producing American Political Culture in the Age of New Media," 2003. <http://faculty.washington.edu/pnhoward/publishing/articles/socialcontract.pdf>.

(Continued)

*Primary Examiner* — Annan Shang
(74) *Attorney, Agent, or Firm* — Niro McAndrews, LLC

(57) ABSTRACT

Systems and methods for facilitating and targeting of online ads to voters within a selected political demographic are presented. Audience targeting may be accomplished in several ways including: geo-targeting; contextual targeting; behavioral targeting; site placement; and targeted household television ads. This segment or neighborhood level targeting allows more granularity based upon, for example, hot topics and people interested in those topics based upon where populations of people live (i.e., the location of the household) and voter registration. In this manner, a candidate may delivery an ad in order to influence a select group of people in a particular location. In some embodiments, the ad is delivered by dropping and later reading a tracking cookie that associates the voter's browser with political demographic information.

25 Claims, 33 Drawing Sheets

(56) References Cited

U.S. PATENT DOCUMENTS

| | | | |
|---|---|---|---|
| 5,933,811 A * | 8/1999 | Angles et al. | 705/14.56 |
| 5,948,061 A | 9/1999 | Merriman et al. | |
| 6,141,010 A * | 10/2000 | Hoyle | 715/854 |
| 6,449,657 B2 * | 9/2002 | Stanbach et al. | 709/245 |
| 6,857,024 B1 * | 2/2005 | Chen et al. | 709/231 |
| 8,131,585 B2 | 3/2012 | Nicholas et al. | |
| 2007/0124789 A1 | 5/2007 | Sachson | |
| 2007/0162343 A1 | 7/2007 | Landesmann | |
| 2009/0169178 A1 | 7/2009 | Higgins et al. | |
| 2009/0259517 A1 | 10/2009 | Wise | |
| 2011/0064021 A1 | 3/2011 | Patini | |
| 2011/0066497 A1 | 3/2011 | Gopinath et al. | |

OTHER PUBLICATIONS

International Search Report dated Dec. 10, 2012 from corresponding International Patent Application No. PCT/US2012/052119.

CampaignGrid—Likely Donor Hot Spots Internet Archive: http://www.campaigngrid.com/index.html https://web.archive.org/web/20100731122549/http://www.campaigngrid.com/index.html Accessed Mar. 4, 2015.

CampaignGrid—What We Offer Internet Archive: http://www.campaigngrid.com/offerings https://web.archive.org/web/20100730055800/http://www.campaigngrid.com/offerings Accessed Mar. 4, 2015.

CampaignGrid—Who We Serve Internet Archive: http://www.campaigngrid.com/who_we_serve https://web.archive.org/web/20100731122712/http://www.campaigngrid.com/who_we_serve Accessed Mar. 4, 2015.

CampaignGrid Online Advertising for Candidates and Causes The Exclusive Republican Online Advertising Network for Candidates & Causes.

The Political Ad Practice Insiders Want to Keep Secret http://www.clickz.com/clickz/news/1698250/the-political-ad-practice-insiders-want-keep-secret Accessed Mar. 13, 2015.

Voter Targeting Comes to Political Video Ads http://www.clickz.com/clickz/news/2109669/voter-targeting-comes-political-video-ads Accessed Mar. 13, 2015.

* cited by examiner

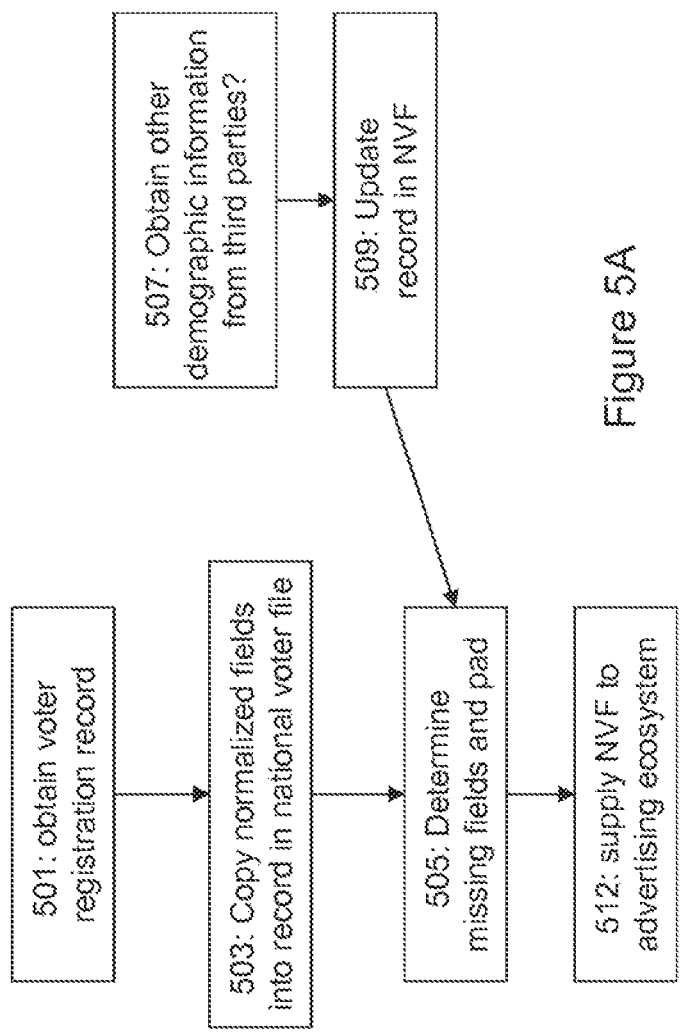

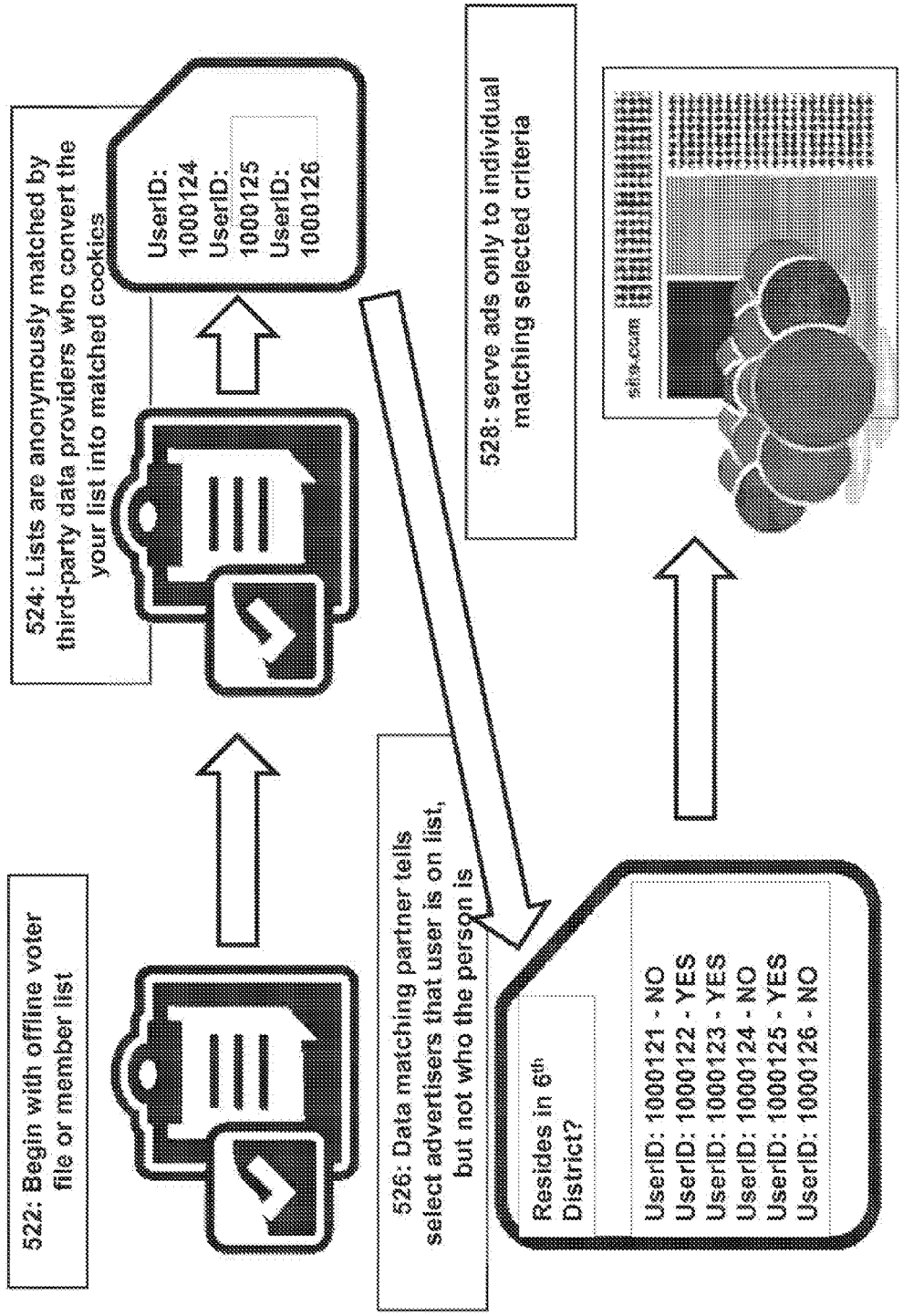

| D1: Electoral | D2: Consumer | D3: Social |
|---|---|---|
| Party Affiliation | Premium/ Specialty | Facebook |
| Vote Frequency | Household Income | Linked In |
| Age/Gender | Wealth | |
| Issue ID | Investor Capacity | |
| Volunteer | | |
| Contributor | | |
| D4: Demographic | D5: Economic | D6: Intent |
| Age/ Life stage | Home Value | Paid Search |
| Occupation – Employer | Home Equity | Search Retargeting |
| Presence of Children | Financing Type | Online Polling |
| Household Composition | Net Worth | |
| | HH Income | |
| D7: Lifestyle | D8: Behavioral | D9: Geographic |
| Purchasing Patterns | Charitable Giving | Lat/Long of Every US |
| Online Activity | Employer | Household |
| Market Channel | Avocation & Interest | Zip Codes |
| Responsiveness | | Census Blocks & Tracks |
| Affinity Groups | | Cable Zones |
| Magazine Subscriptions | | Radio Zones |

Figure 8

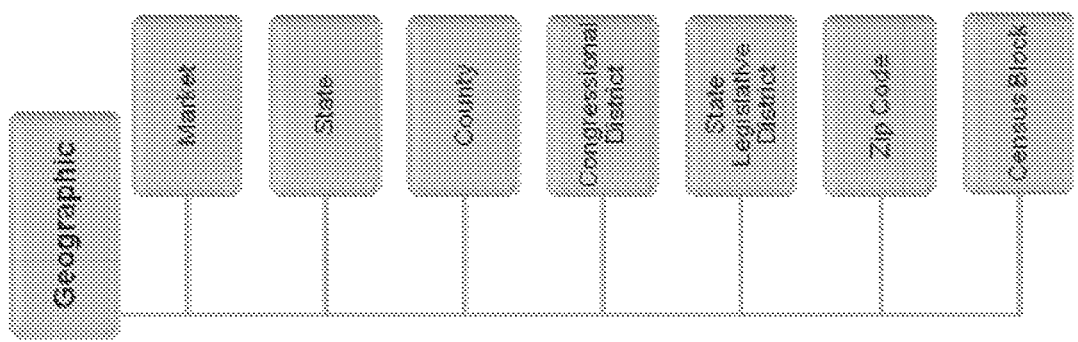
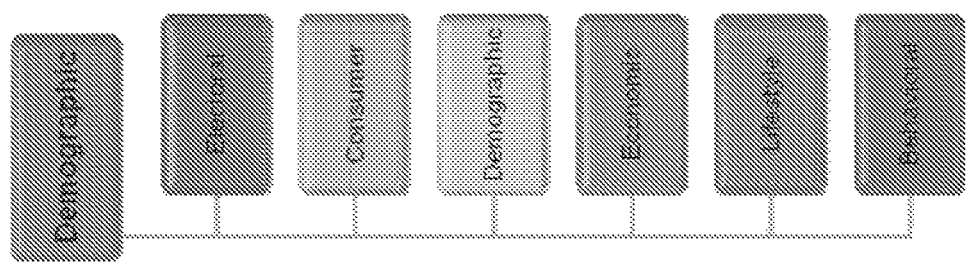
Figure 9

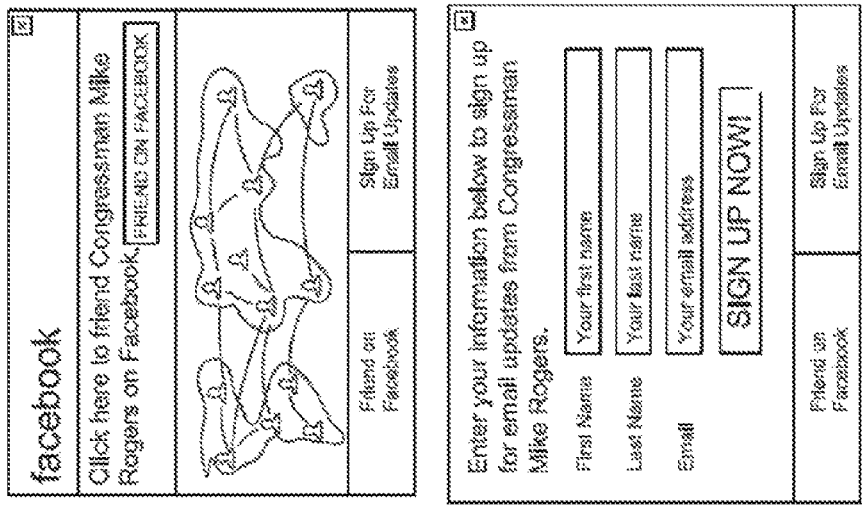
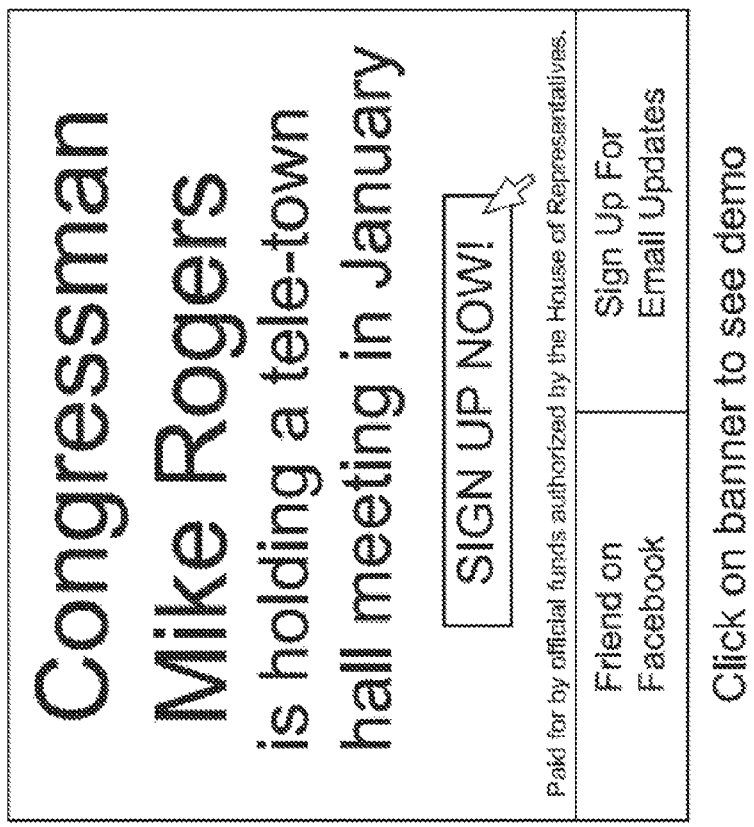
Figure 18

TARGETING ONLINE ADS BASED ON POLITICAL DEMOGRAPHICS

CROSS REFERENCE TO RELATED APPLICATIONS

This application is a continuation of U.S. patent application Ser. No. 13/593,281, filed on Aug. 23, 2012, which claims priority to U.S. provisional application 61/526,413 filed on Aug. 23, 2011, entitled "Targeting Online Ads Based on Political Demographics," each of which is hereby incorporated by reference in its entirety.

TECHNOLOGY FIELD

The present invention relates generally to electronic and network-based communications, and more particularly to systems and methods for facilitating targeted political advertisements on a computer network, mobile device network, and/or Internet Protocol (IP)-enabled television system.

BACKGROUND

Traditional political advertising has been done using traditional media, such as print advertising, TV, and radio. With competition for donor resources and limited funds, there remains a need for cost effective advertising techniques. Importantly, campaigns for candidates or other political causes need to use ads in a cost effective manner to have an impact at the polls.

Currently, media consumption is transitioning from conventional communication means—such as broadcast television and radio, print media, and postal mail—to electronic media distributed, for example, over the internet and via electronic mail (i.e., email). However, advertising spending continues to focus heavily on traditional communications means. Web-based and electronic communications are becoming the industry standard for personal and business use. Increasingly, news, advertisements, business communications, personal communications, and other information (collectively hereinafter also referred to as "media consumption") are being created, stored, and transmitted electronically via computing networks, such as the Internet. A computing network, as used herein, refers to a collection of desktop computers, laptop computers, mobile phones, handheld or mobile computing devices (collectively "personal computing device" or "computing device") interconnected by communication channels that facilitate communications among users and allows users to share resources. At work, employees access such networks, along with their associated corporate computing resources from their local computing-device, on a daily basis in order to perform their jobs. Away from work, people similarly access such networks and resources, typically through home, mobile, or remote connect ions. Numerous types of electronic and network connections and communication channels are ubiquitous in the industry and well known to one familiar with this technology and industry. For example: wired and wireless connections, a local area network (LAN), a wide area network (WAN), a virtual private network (VPN), high speed connections of various types, intranets, extranets, the Internet, and the like.

Online advertising often prices ads on a per impression basis, where an impression is a single instance of displaying an ad to an individual. Paying for an impression to an individual that is sot registered to vote, unlikely to vote, or has likely already made up her mind on the issue, may be a wasted impression that costs the campaign precious capital. Furthermore, the ability to serve up individual impressions on a screen to a specific individual presents a unique opportunity and challenge not addressed in traditional media campaigns. As such, there remains a need to create strategies and technologies that deliver individual advertising experiences to voters to support political campaigns.

SUMMARY

Embodiments of the present invention address and overcome one or more of the above shortcomings and drawbacks, by providing devices, systems, and methods that enhance the electronic and network-based delivery of political advertising. This technology is particularly well-suited for, but by no means limited to, web-based advertisement by political campaigns, as well as associating politically important demographic information with individuals as they browse the web, without exposing personal identifiable information about that individual. One such example is associating a browser user with a cookie that includes or is associated with political demographic information. Another such example is associating a unique ID of a mobile browser, such as a phone number, sim card, or hardware identifier, with political demographic information.

Embodiments of the present invention provide a solution that associates geographic and demographic data including location information with a user. Geographic data may include the following data: market, country, state, county, street, house number, Congressional District, State Legislative District, Municipal District, zip code, census data, census block, latitude and longitude, GPS coordinates, cable television zone, current location, work location, home location, and the like. Demographic data may be linked or otherwise associated with the geographic data to allow Micro-targeting of segments of voters sharing one or more demographics. Demographic data may include the following data: voter, consumer, demographic, economic, lifestyle, behavioral, and the like. Demographic information can also include political demographic, information and behavioral information, including issues a user is interested in, party registration, voting frequency or last time the person voted, political or other websites the user has visited, browsing history, political or other email lists or social networks the user has joined.

Some embodiments also overlay the geographic and demographic data on a map to allow decision making to determine which users to target in advertising campaigns, providing a visual reference tool to gauge how effective targeted advertising can be or to track how effective the advertising has been when changes in political polls are considered. Grouping of users on a map or by other criteria can be used to generate statistics about users that meet certain filterable criteria, to determine how many people an ad will reach if targeted to a selected multi-dimensional demographic.

Some embodiments of the present invention provide a system and method of gathering political demographic information from various sources, converting it to a standardized format, and associating demographic information with a user via a cookie, ID, or other tag when a match for the user is found within, the subscriber list of a cable television or mobile network provider, or when the user visits a first website. When the user visits a second website, the tag of the user can be used to associate the user's browser with the political demographic information, allowing impressions to be presented to the user based on the political demographic information. The decision to present au impression, such as a political ad or video, can be based on filterable criteria that include the political demographic information and other information. In some embodiments, based on the filter criteria, a decision is made whether to bid or an ad exchange and how much to bid based on whether a user's cookies meet the filterable criteria. One aspect of the invention may include granting access to the tag to multiple parties and website to allow these parties and websites to determine political demographic information about individuals that visit a website. This may allow usage statistics to be gathered related to political demographic information and allow politically relevant ads to be displayed when an individual visits the websites. Another aspect of the present invention may include receiving a tag associated with an individual that can be associated with a database of political demographic information to associate the individual with this information. Another aspect is stripping personal identifiable information from the cookie, such as by associating a cookie ID with demographic information about the user, but not the user's identity.

Some embodiments of the present invention provide an interface to a user, such as a campaign manager, that allows the selection of demographic data, voter registration data, and/or behavioral criteria to identify multi-dimensional demographics to target with electronic advertisements. After selection criteria have been identified, the system, and methods can apply these criteria to match incoming requests for bids to serve ads on a webpage to determine whether to bid on individual impressions. The system can then bid on impressions in real-time for individuals that meet the criteria when these individuals visit associated webpages. In some embodiments, the user interface is a web page that allows users to select political districts to target with online ads via a map interface. In some embodiments, the user interface allows the user to select, criteria such as voter history, party affiliation, household income, services subscribed to, education level age, and browsing history. In these ways, the user can select targeted criteria to increase the influence an impression will have en a voter's ultimate decision to vote.

Formats for the advertising impression sent to individuals may include text message, banner message, video messages, roll-over messages, text over video, video, TV commercials or streams, and the like.

According to an embodiment, a method, for targeting messages to voters includes the steps of receiving a plurality of first records for a first group of voters, each including political demographic information associated with a first voter, and determining the likely identity of the first voter browsing a first website. The method further includes steps of creating a cookie that correlates a browser of the first voter to at least a subset of the political demographic information associated with the first voter using a processor and sending the cookie to the browser of the first voter across the internet. The cookie can be configured to allow subsequent association of the political demographic information with the browser at a second website.

According to one aspect, the method may further include the step of causing an advertisement to be transmitted to the browser when the cookie is detected at the second website or determining if the political demographic information associated with the cookie matches as selected demographic criteria to determine whether to bid on an advertisement impression. According to another aspect, a unique identifier of the cookie cannot be used to determine the identity of the first voter. According to yet another aspect the method may further include the step of creating a record of the cookie in a second group of records that can be shared with other partners to determine which browsers correspond to selected demographic criteria. According to stilt another aspect, the subset of the political demographic information may include a political party associated with the first voter or at least one voting district associated with the first voter.

According to another embodiment, a method for displaying a message to potential voters includes the steps of receiving information from a browser that includes at least one cookie identifier that correlates a first set of political demographic information associated with a likely identity of a user of the browser with the browser and receiving a second set of political demographic information that includes information for targeting advertisements to potential voters. The method further includes steps of comparing the first and the second sets of political demographic information to determine a responsive set of cookies that match the second set of political demographic criteria, receiving a request to serve an ad impression to the browser, and requesting, automatically, using a processor, display of an ad impression to the browser if at least one of the cookies is among the responsive set of cookies.

According to one aspect, the sets of political demographic information may include at least one political district or at least at a political party associated with the likely identity of the user. According to another aspect, the method may further include automatically generating, using the processor, a bid for the right to display the ad impression.

According to another embodiment, a method for targeting a message to selected potential voters includes steps of providing an electronic map interlace configured to allow a user to select political demographic criteria to define a target group of voters, determining a subset of registered voters in a database that are part of the target group, and selecting a message to display to the subset of voters. The method further includes the step of automatically requesting electronic display the message to users of a group of electronic devices who have a likely identity of one of the voters in the subset of voters.

According to one aspect, the step of automatically requesting electronic display of a message may include requesting display of an advertisement to a subset of cable, IPTV, mobile or satellite TV subscribers whose household includes at least one member that is in the subset of voters. According to another aspect, the step of automatically requesting electronic display of a message may include bidding on ad impressions to be displayed on an electronic device associated with at least one member that is in the subset of voters. According to yet another aspect, the step of automatically requesting electronic display of the message may include requesting display of the message as an ad impression on an electronic device, which is coupled to a cable, satellite or mobile network and associated with at least one member that is in the subset of voters. According to still another aspect, a user of a browser on one of the a group of electronic devices may be identified as matching selected demographic criteria based on at least one tracking cookie placed on the browser. In yet another aspect, the electronic map interface may allow a user to select the political party affiliation of voters to target with the message or at least one electoral criterion.

According to another embodiment, a method for targeting a message to selected potential voters includes steps of receiving a request for displaying one or more advertisements to a group of individuals, the request including selected political demographic criteria to define the group and determining, via a processor, a subset of electronic records of a database that match the selected political demographic criteria. The method further includes steps of identifying at least one electronic device associated with the subset of electronic records and transmitting the one or more advertisements to the electronic device.

According to one aspect, the method can further include bidding on an ad exchange for ad impressions associated with a browser running on the electronic device. According to another aspect, the step of identifying at least one electronic device associated with the subset of electronic records can be performed by a cable provider and the electronic device is associated with at least one cable subscriber. According to yet another aspect, the electronic device may be a set top box that is associated with at least one household and is configured to display live TV to viewers in the household.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 5A is a flow chart for creating a national voter file for use with embodiments of the present invention;

FIGS. 5B-D are flow charts for using an offline database and/or a national voter file to target individuals;

FIG. 8 shows exemplary data sources that may be used to target individuals for online advertisements;

FIG. 9 shows how individuals may be arranged;

FIG. 18 shows exemplary banner messages for list building;

DETAILED DESCRIPTION OF ILLUSTRATIVE EMBODIMENTS

Figure 1:
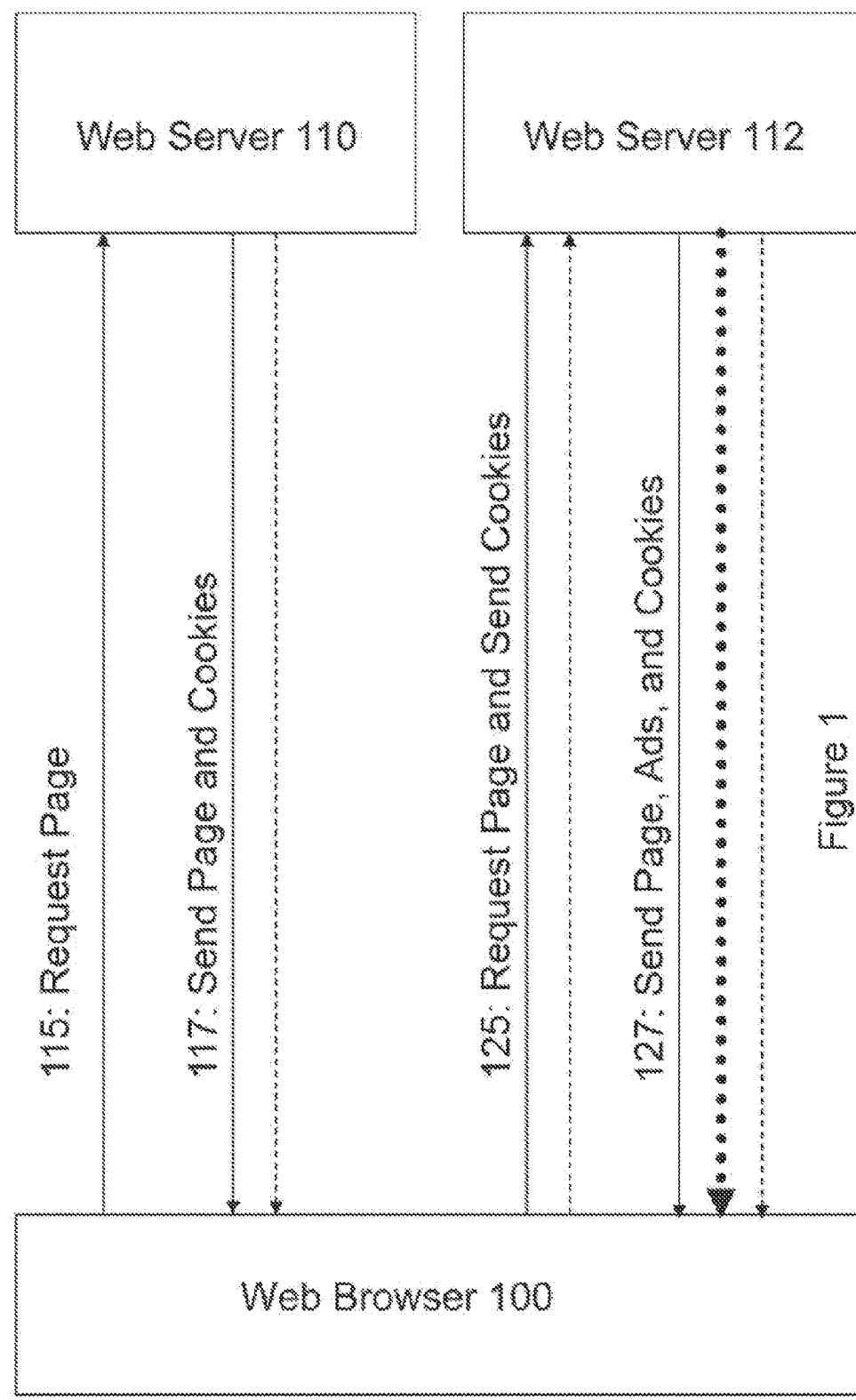
FIG. 1 is timing diagram demonstrating the basic model for cookies for use with some embodiments of the present invention.

The above problems in the prior art have motivated the creation of systems and methods for facilitating and allowing targeted delivery of political advertisements in an online ecosystem. In one embodiment, when a web-user (e.g., a potential, voter) visits a website that recognizes her identity, such as a site she logs onto, the website will send lag information (such as a tracking cookie) that contains, or is correlated to, political demographic information (PDI), such m voting precinct, party affiliation, ethnicity, or any other demographic information that can be useful for targeting political ads. This demographic information can come from a database that include normalized PDI gathered from a plurality of sources, including voter registration lists that are available from almost all secretaries of state in the United States. Once the tag has been dropped on the web-user's computer, such as in the cookie store, the tag can be used to identify the political demographic of the user, generally without having to reveal the identity of the user, when the user visits other websites, such as content websites (e.g. foxnews.com, cnn.com, etc.). At these content websites, when ads are displayed, the website will collect the web-user's tag in formation for direct the web-users browser to send the tag information to a 3rd party ad server). An ad server component cart then determine whether a given political ad (such as a flash animation, video, or banner ad) should be served to the web user at the content website based on the PDI associated with the tag.

Similarly, other PDI, such as gender, race, alienage, etc., may be excluded from consideration by certain embodiments, while other embodiments may include these classes of PDI. The term PDI should be construed broadly to cover demographic information about a voter that may be collectively relevant to a message. In some embodiments, PDI includes at least a portion of a voter registration record, including a political district in which a voter is registered to vote.

In some embodiments, any personal identifiable information associated with a user is removed from cookie for privacy reasons.

Embodiments of the electronic and network-based advertising solution provide for targeting voters online, which provides improvements over conventional communications, such as direct mail, radio, or television which are untargeted to subsets of voters, because the online advertisement is interactive and faster (e.g., certain aspects occurring in substantially real time). Targeting may be to potential voters or an identifiable segment of constituents/voters. An identifiable segment of voters may be defined by location and/or one or more demographics. These demographics can be rapidly changed or be used to define multiple segments of voters to target with different ads. This allows faster and more targeted ad strategies than traditional ads and mailing. These techniques allow delivery in substantially real time of more dynamic and vivid ads, including interactive ads.

Audience targeting may be accomplished in several ways. For example, embodiments of the present invention may include: (1) gee-targeting (e.g., customizing messages for local preferences down to the zip code+4, global phone, GPS coordinates, latitude/longitude, cable zone, etc.); (2) contextual targeting (e.g., placing ads in the context of articles that relate to an issue); (3) behavioral targeting (e.g., delivering ads based on voters' interests and browsing activity); (4) site placement (e.g., reaching voters in the context of a source they trust for their news and information when ads are strategically placed); (5) political demographic targeting (e.g., targeting Hispanic Republican voters in a hotly contested voting precinct). Embodiments of geo targeting work off the idea location, such as zip code or IP address if correlated to a location, such as by using available correlators that utilize ISP and hierarchical IP addresses to approximate or pinpoint the location of a voter's internet connection. When a voter connects to a website via a mobile device, the device's cellular location or phone number can be correlated to the voter's present location or to a certain billing address when the solution is partnered with the voter's carrier. Embodiments of contextual targeting can also work off the idea of relevancy. The solution may scan web pages for key words, such as a person's name, an issue, a topic, etc., in a district. When the key word is found, an ad may be served on those pages. Political, demographic targeting may utilize a database of PDI, census data, and public voting registration records (e.g., last election voted in) to associate the demographic information with the web browser the voter uses by tagging the voter once his identity can be ascertained at a web site that knows his identity, such as a web portal like Yahoo or Google or other sites the voter logs into, such as her bank. This tagging can be in the form of a tracking cookie, as explained below, or may be more passive from the voter's perspective, such as associating the voter's IP address or other identifier with the voter's PDI at a server, such that the voter's PDI can be instantly identified when the voter visits subsequent sites that intend to display political advertisements, such as a content site.

Embodiments of geo targeting work off the idea location, such as zip code or IP address if correlated to a location, such as by using available correlators that utilize ISP and hierarchical IP addresses to approximate or pinpoint the location of a voter's internet connection. When a voter connects to a website via a mobile device, the device's cellular location or phone number can be correlated to the voter's present location or to a certain billing address when the solution is partnered with the voter's earner. In the instance of an identifier, such as a cell phone number or other unique ID from a phone, a carrier may present non-traceable personal information, such as a zip code, to ad partners, to assist in serving an ad impression. In some embodiments, a carrier can assist in serving messages in a given zip code (or other geographic area) without conveying which mobile devices meet the criteria. For example, a cellular carrier, or ISP, may present ads directly, and solicit requests from advertisers, which could include PACs, candidates or the like, to display ads. The carrier could then apply filters internally to determine which devices to expose a message.

Geo-targeting can be a helpful tool for limiting ad impressions to individuals meeting desired criteria and may be accomplished in many ways, as described herein.

Using Cookies to Identify Voters in a Demographic

In some embodiments, political demographic information (PDI) can be associated with a voter (and her computer or browser) by using tracking cookies. Cookies are text files that can be stored on a user's computer at the instruction of a web page and can later be accessed when the user returns to the same website or, in some cases, visits another website. Cookies allow a number of capabilities that enhance the stateless Internet experience for a web-user. A basic first party cookie allows users to log into a web site once and then be remembered the next time they visit. For instance, the first party cookie enables electronic commerce sites to offer virtual shopping carts, allowing an online customer to select more than one item as they browse paying by entering credit card information, only once, when they have completed their shopping.

Cookies can also be employed in some embodiments to measure and enhance the effectiveness of message delivery. For example, cookies can be used to keep track of which ads a user has been exposed to, so ads can be presented in the order and frequency the advertiser feels is most likely to interest the user. These types of cookies are often dropped and read by third-party web sites, such as ad exchanges, that are asked to select, verify that ads have been presented or to consolidate statistical information on viewership patterns. For example, when visiting content websites, often the ads will be served by a third party site via a redirection or inclusion, and cookies used for determining and tracking the advertisement are sent to the third party ad server. These ads can be served in many forms including static ads and JavaScript and Flash animations.

Advertising delivery traditionally involves several different players: (a) an advertiser who wishes to place one or more advertisements before prospective customers or voters; (b) a publisher, such as a content web site owner or service provider, that can offer an advertiser an audience; (c) an advertising agency or exchange that arranges advertising placements with publishers on behalf of advertisers for a fee; and, of course, (d) the consumer or voter who is exposed to the ads. There is also a rapidly changing ecosystem of middlemen and information exchanges that offer software and services to assist in the tracking and targeting of advertisements.

Advertisers, who often pay large amounts of money for ad placements, want to track their ads and ensure these ads are targeted to the right consumer. In Internet advertising, there are additional methods by which ad exposures are measured and paid for, such as the number of viewers who click on or otherwise interact with an on-line ad. For these payment models to work, there must be some mechanism to collect information when users perform these actions. Cookies are widely used for this purpose.

One can think of the online advertising system as an ecosystem. Partnerships between sites and parties allow parties to drop cookies on a consumer's computer as she surfs the web and then view these cookies when she visits a site that displays an ad. These partnerships allow bidders (or at least a subset of the bidders) on an ad exchange to consider the information contained in the cookie (or correlated with the cookie) in making the decision of whether to bid to display an ad and the value of the impression of the ad. While a website displaying an ad may lack a formal relationship with another site that drops a cookie on the consumer's browser, relationships with third parties-allow the correlation of information about the consumer and her cookie to ensure that ads can be targeted to the consumer. This ensures that the most relevant and valuable impressions are served to the consumer when she visits a content site. These third parties work together to drop a cookie on a consumer's computer, provide access to other parties to the information of the cookie, access multiple cookies when a consumer visits a content site, provide an ad exchange to allow parties to bid on ad placement based on the information those patties have discerned from one or more cookies on the consumers browser, and provide hosting and serving of ads based on the ad selected by an ad exchange or by the content site.

The IETF has created a standard for cookies in RFC 6265, available at ietf.org and incorporated herein in its entirety. While the standard does not allow third party cookies, most browsers still allow these cookies, provided that these parties have a compact privacy policy. First-party cookies are cookies set with the same domain (or its subdomain) in your browser's address bar. Third-party cookies are cookies being set with different domains than the one shown on the address bar. Cookies can also be persistent, lasting on a consumer's computer for up to one year. These can be used to record behavioral information, such as websites visited recently and how the consumer came to visit the present site.

FIG. 1 provides a basic example of how a cookie can be used to track information about a consumer. Web browser 100 visits a first website at web server 110, such as a shopping site. To get content from the server 110, browser 100 sends an HTTP request 115 or the like. This includes information needed by web server 110 to retrieve and serve the proper site, such as a URL. At 117, the web server 110 responds with the requested page, often along with one or more cookies. These can include simple first party cookies such that web server 110 can tell if the user of web browser 100 has visited before or has logged in before. These cookies can include information that can be shared with third parties, such as those with access to web server 112 to determine information about the user of browser 100, such as the type of webpage requested from web server 110, such as an article about a political candidate. These cookies can be persistent and remain, on web browser 100 for months, until deleted by the browser or user. Subsequently, when the riser requests another page from server 110 or another server 112, web browser 100 sends a request and any cookies pertinent to die request, such as cookies associated with the same domain as the website requested. In response, server 112 responds with the requested page at 127, along with any ads that have been selected in response to the cookies, such as an ad for the political candidate that appeared in the article previously sent to browser 100. Web server 112 can also respond with additional cookies, it should be noted that as part of the page returned in response to request 125, web server 112 may redirect web browser to other sites or servers for a portion of the overall content, such as pictures or ads. As part of that redirection, the web browser 100 will send a related request and can send cookies related to that request to additional servers. Therefore, it should be appreciated that request and response 125 and 127 can be iterated multiple times and involve more than one web server to complete the request and display a complete page to the user of browser 100.

Figure 2:
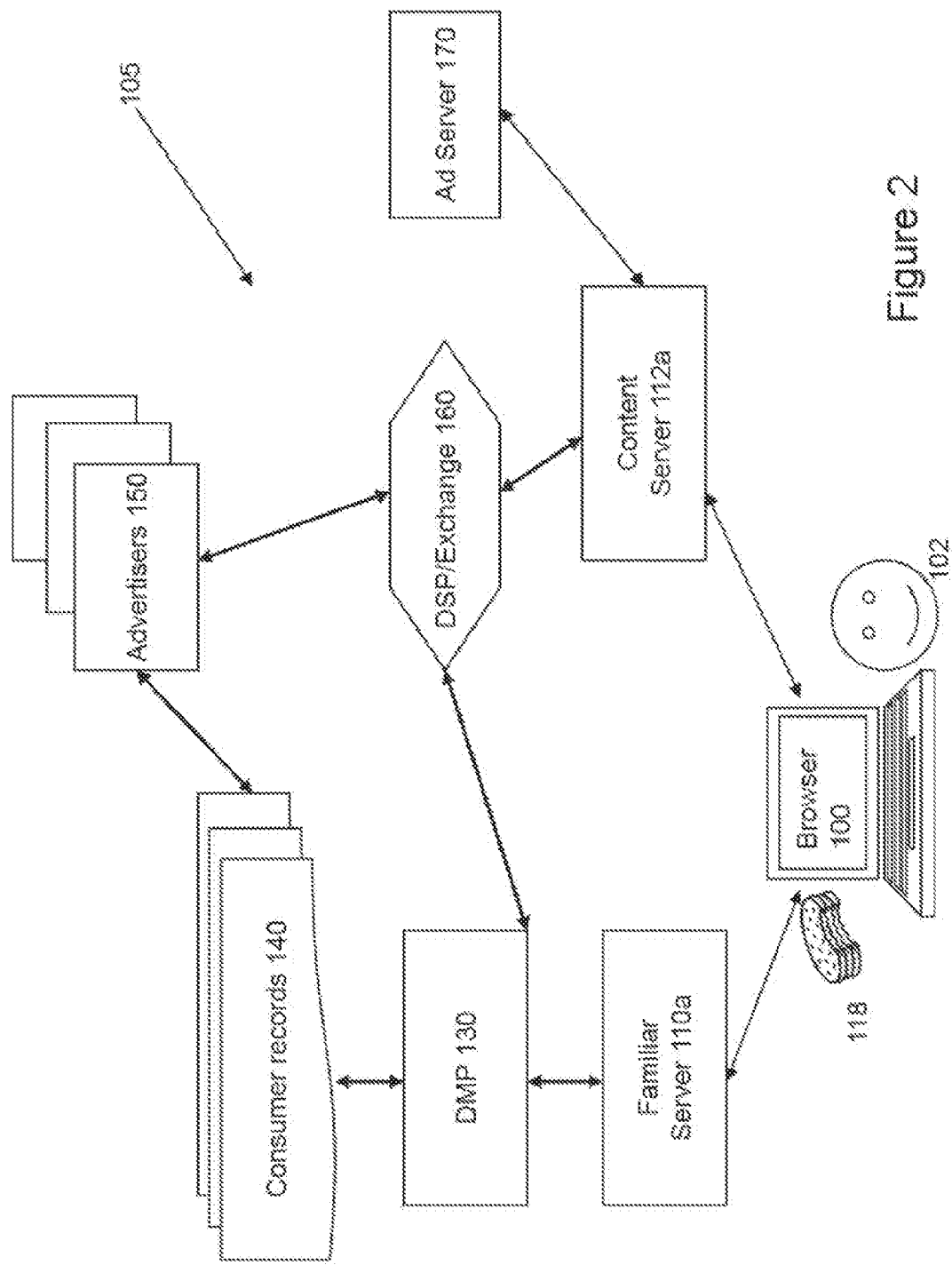
FIG. 2 is a system level diagram that illustrates the various interactions in the advertising ecosystem used by certain embodiments of the present invention.

FIG. 2 shows an ecosystem 105 for utilizing cookies across multiple web servers and web pages in accordance with some embodiments of the present invention. In this example, a voter 102 using browser 100, accesses a website hosted by server 110a. This website and/or the server, can be a website to which the voter is familiar. For example, the requested page can be a website that includes a log-in component that allows the server 110a to discern the reap world identity of the voter 102. For example, if the requested page is a page for online banking, the voter will be asked to supply login credentials. The bank has access to certain personal information, such as address, name, phone number, etc. The bank may also receive cookie information that tells server 110a more information about the voter 102, such as behavior information about past browsing or oilier cookies placed by previously visited sites.

Many sites that know the identity of the voter 102 share certain information with partners in accordance with a privacy policy. In this example, the familiar web server shares the identity of the voter 102 with a trusted partner 130. In this case the partner 130 is a Data Mining Provider. DMP that assists companies, such as cookie partners 140, in associating their cookies, which can often be proprietary, with users. In this example, the DMP 130 is given, access to the user identity information, which it protects, and access to associative information provided by consumer records 140, which can include relational databases, flat files, and the like, and can be provided by third parties, including advertisers 150 or third party vendors that work to provide information that allow advertisers to target individuals meeting desired consumer criteria. In this example, the consumer records 140 includes database or flat file that has PDI for a majority of US voters to DMP 130. This PDI can include, amongst other information, voter registration data in a normalized format to identify the age, political party registration, address, age, voting precinct, etc., of the voter. The PDI can also include demographic information from surveys, census data, or third party providers to determine ethnicity, income level, credit scores, marital status, or other socio-economic information that may not be available in the voter registration, data obtained from public records. The DMP, in concert with the records 140 related to the voter 102 identified by server 110a, can associate the PDI with the browser 100 for use in subsequent advertisements.

DMP 130 can associate the PDI with browser 100 in numerous ways, including supplying cookies to browser 100 that include PDI directly as key-value pairs in encrypted or unencrypted form. Alternatively, the PDI can be associated with the browser 100 via a correlation with a substantially unique identifier that is sent to the browser 100. For example, a cookie or cookies 118 could include a key-value pair that gives the browser 100 a unique (or at least pseudo-unique) identifier that can be used to look-up records later when another server receives the cookie 118. This cookie 118 can already reside on the browser 100 prior to visiting familiar server 110a, or be dropped by the server during the visit. In some embodiments, the cookies dropped onto browser 100 have had any personally identifiable information (PII) removed for privacy. That is, the voter 102's name and address have been removed, but important PDI, such as voter registration, and voting precinct are included in some form, whether directly in the cookie 118 or included by association with aft identifier contained in the cookie 118.

In some embodiments, die PDI is associated with the voter 102 in a restricted form, such as an ID that is associated with a database, or in other forms that make access difficult or impossible for parties to access the PDI unless authorized by the DMP 130 or provider of consumer records 140. This enables the provider of consumer records 140 to license access to voter 102's PDI during subsequent web browsing. This can provide the creator of records 140 alternative revenue streams or can give associated advertisers 150 a distinct advantage in bidding for impressions to serve to voters, such as voter 102.

The DMP 130 can communicate the association between cookie or cookies 118 and the PDI to an ad exchange 360, which includes a digital service provider (DSP) that acts as a bidding engine to help select appropriate ads based on cookie information. This allows the DSP to solicit bids for an ad impression when voter 102 visits content server 112a.

When voter 102 visits a content website (such as a news site) the content provider can make money by selling advertisements. To do this, a portion, of the content webpage, such as an article, can include space for banner or flash animation advertisements. When browser 100 visits the content server 112*a*, the browser can send cookies, including those dropped by server 110*a* or associated by DMP 130, as well as any other appropriate cookies. When determining which ad to display for the current impression, content server 112*a* can, reach out to exchange 160, alerting the exchange that there is an impression available. Content server 112*a* can pass along any information about the voter 102 (or any other consumer) to the exchange 160, including the cookies received and any user or behavior information about the voter 102, including information about the current page being viewed. In some embodiments, cookies on browser 100 may include domain restrictions preventing them from being passed to content server 112*a*. When serving-a content web page, content server 112*a* can redirect browser 100 to DSP 160 (or an affiliated server) to get content for the advertisement as the browser renders the webpage. In this manner, exchange 160 can obtain cookies related to demographic and behavioral information of voter 102 directly from browser 100.

Once exchange 160 receives a request for an advertisement from content server 112*a* and information about voter 102, exchange 160 can solicit bids for the impression from advertisers 150 via the DSP. Bids on the electronic exchange are nearly instantaneous, taking place in a fraction of a second based on rules set up by advertisers 150. In the case where browser 100 contains cookie information associated with the PDI of voter 102, the DSP of the exchange 160 can use this information in the bidding process. The DSP has access to the PDI by synchronizing with the DMP when the cookie 118 was dropped on browser 100. Advertisers that are authorized to access the PDI associated with voter 102 can use this PDI as part of the bidding process. An advertiser 150 can create multiple bidding rules for DSP 160 to follow.

For example, an advertiser may want to bid a fixed (or dynamic price) to display an ad for a Republican primary candidate to registered Republican voters in Iowa ahead of an upcoming caucus. Accordingly, the bidding rule can be to bid a fixed price on the exchange for each unique voter that has PDI that reveals "State=Iowa" and "Registered Party=Republican." If the advertiser has an arrangement with the exchange 160 to consider cookie 118 and the associated PDI of voter 102, the DSP will apply the advertiser's rule and place a bid on the exchange in the event that the PDI of cookie if voter 102 is a Republican residing in Iowa. If this bid wins, the advertiser has won the right to serve the ad impression to voter 102.

Exchange 160 can then direct-content server 112*a* to display the ad selected by the winning advertiser, which server 112*a* may obtain from a third party ad server 170 that hosts the ad. This may also be accomplished in some embodiments by redirecting browser 100 to request a specified ad directly from ad server 170. Another cookie may be placed on the browser 100 to indicate that she voter has been shown the selected ad. The ad server 170 or content server 112*a* can report to the exchange 160 that the ad has been displayed to the voter 102 for payment processing.

Use Cases

In some embodiments, ads may target voters in individual districts—i.e., the Congressional or State voting district—residing within that district. For example, an e-communication is shown only to people in a congressional district. For example, a zip code(s), or a longitude(s)/latitude(s), or a GPS location, etc. Further, the ad may micro-target to an identifiable group or segment with a district. This segment or neighborhood level targeting allows more granularity based upon, for example, hot topics and people interested (or most likely to be interested) in those topics based upon where populations of people live (i.e., the location of the household). In this manner, an ad may be delivered to a subset of voters in order to influence a select group of people in a particular location. For example, voters in a particular district may be identified by zip code and an ad may be delivered to a voters online in that zip code.

This can be accomplished in a few ways. In some embodiments, when a voter logs on to a website or enters geography information associated with a location, a first server 110*a* may drop a cookie indicating this location. This cookie may be dropped based on the IP address of the browser 100, as a database may include a correlation, of IP addresses to known locations or cable zones. When the user resurfaces at a content site at server 112*a*, one or more cookies that relate to geographic information of the voter can be read by server 112*a* or an affiliated ad exchange 160. Advertisers can now bid on the voter based on the geographic information. It should be appreciated that some advertisers will view the voter receiving the impression as a consumer of some non-political goods and may base their decision on the same or other criteria in deciding whether to display an ad for a car, for instance. The exchanges allow political ads to be bid on the same exchange as other ads.

A message may effectively be delivered to an IP address associated with a location (home) associated with that IP address. The electronic and network-based solution does not rely on personally identifiable information, but rather on all individuals in a finite geographic area that share a common interest, trait, characteristic, etc. In other words, rather than serving a message to an individual, an electronic and network-based advertising system can send it to art identifiable population with a given area (e.g., one to few). This can add value by allowing voters, or segments of voters, to see relevant ad content based on geography and/or demographics. In some embodiments, cookies that can be correlated to demographic information, including location, are placed onto a user's browser, but the cookie contains no personal identifiable information, can be used to trace a user's identity.

In some embodiments, the server 112*a* or ad exchange 160 can view the IP address of browser 100 and associate it with a location (home) associated with that IP address. This can allow serving of ads to voters in a district without using tracking cookies.

In some embodiments messages can be delivered based on location or PDI to target individual voters, an ad may target individuals in a finite geographic area (e.g., district) that share a common interest, trait, characteristic, etc., deemed relevant to a political ad. In other words, rather than serving a political ad to an individual based on personal information or serving an ad to all visitors of a site, the electronic and network-based ad system can sends an ad to an identifiable population with a given area (e.g., one to few). This adds value by allowing voters, or segments of voters, to see relevant political ad content based on geography and/or demographics.

Similarly, by using information, such as a cookie or IP address, that are not unique to a content site, messages can be shown to users of general interest. For example, content web sites (e.g., those sites residing on exemplary server 112*a*) may be selected based upon, for example, traffic, location, interests, demographics, etc. Examples of sire selection may include: search (Google, Bing, Yahoo!, etc.); Facebook; national news (e.g., New York Times, Wall Street journal, Washington Post, etc.); local news, television, radio, weather; men and women (e.g., AllRecipes.com, MarthaStewart.com, etc.); sports; Email (Gmail); issues (e.g., healthcare, energy, economy, or industries of interest or importance to a particular district) to name a few. Sites may be selected from, one or more site lists.

The output of the electronic and network-based advertising system 105 may include a complete reporting package. For example, these may include impressions and clicks by site, and click through to a candidate's official site. Also, conversions, such, as email, newsletters, town hall sign ups, and the like may be tracked.

Ad Targeting System

Figure 3:
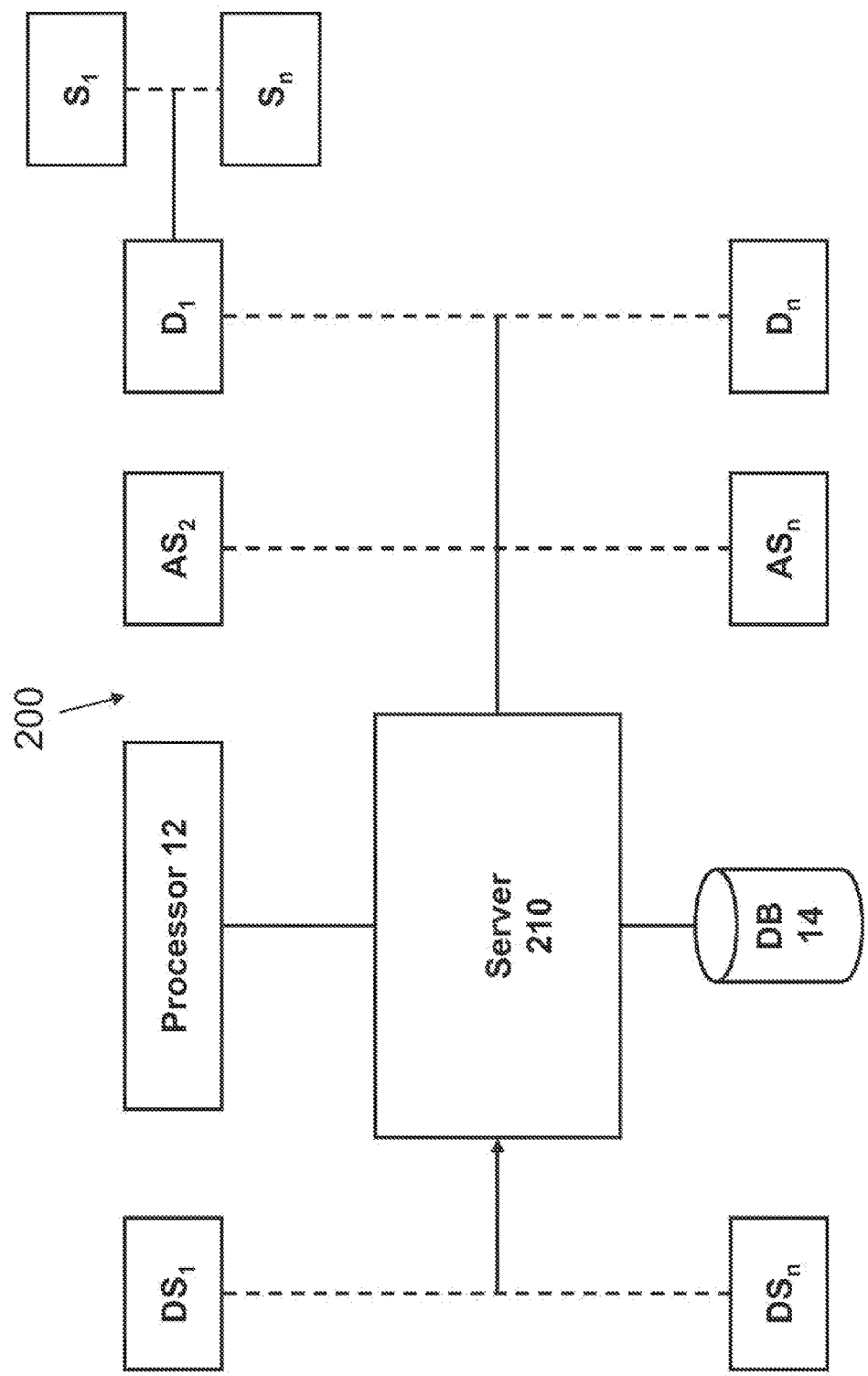
FIG. 3 is a block diagram, showing features of an online advertising system in accordance with one embodiment of the present invention.

With reference now to FIG. 3, there is shown an ad targeting system 200 for implementing an embodiment of electronic and network-based ad targeting system. As shown in FIG. 1, the system 200 includes data sources $DS_1$-$DS_n$, a decision server 210 that receives data and other information, from the data sources $DS_1$-$DS_n$, an output for sending data and other information generated by the server to one or more ad or message servers $AS_1$-$AS_n$, and one or more districts of voters $D_1$-$D_n$. This topology allows scalability and multiple data sources and ad partners for targeting voters. The voting population and geographic regions may be further defined by one or more segments $S_1$-$S_n$. A segment includes an, identifiable subset of voters. The decision server may include a processor 12 and database 14 for processing and storing tire data.

Figure 4:
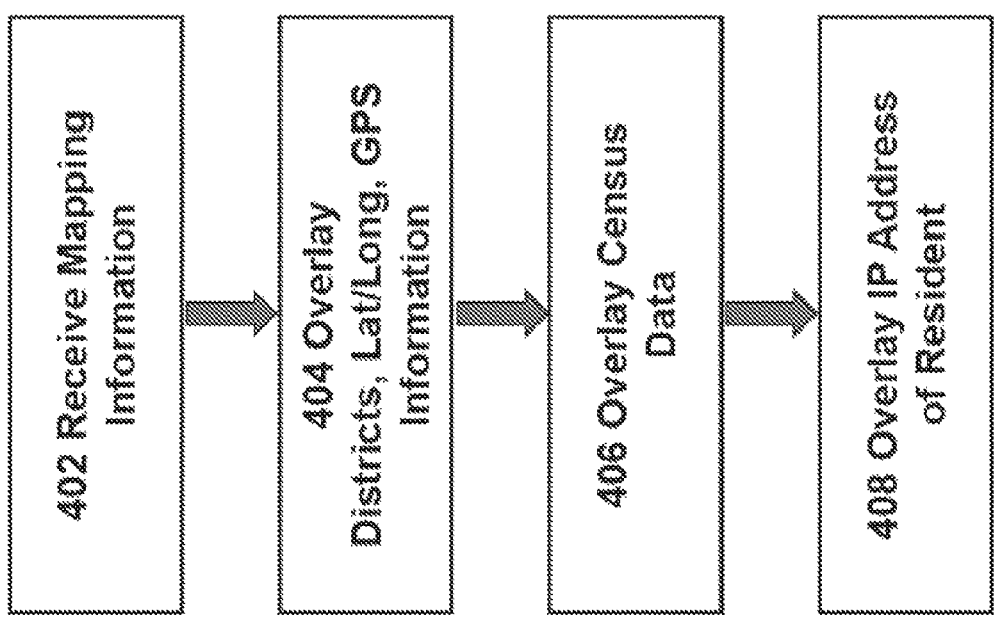
FIG. 4 is a flow chart showing an exemplary process for generating maps for geographic targeting of electronic advertisements.

The ad targeting system can include a map and map building function to include location, as shown in FIG. 4. At step 402, mapping information is received. The map is a visual representation of a geographic area of interest and includes location information. For example, country, state, county, city or town, street, house number, etc. Pre-existing mapping software may be used for mapping, in one embodiment, Google Maps or Bing Maps, web mapping service application and technology provided by Google or Microsoft, respectively, may be used for the map and location information. At step 404, District (e.g., congressional, senate, state legislative or senatorial districts, ward, precincts, etc.) information may be overlaid on the map. This information may include, for example, zip code(s), latitude and longitude, GPS coordinate (s) information, cable zones, etc. As such, congressional districts are mapped electronically. At step 406 Census data, including residence and household information, may also be overlaid on the map to identify and show where residents live within a district. The geographic information may also include latitude and longitude for each congressional district. Further, the address of computing devices (e.g., the IP address) is also collected and overlaid on the map. The IP address data may be collected from the geographic latitude and longitude data, which basically comprises an IP address map of every IP address in a given area.

The census data currently includes at its core approximately eight million census blocks. In some embodiments, the electronic network-based solution arranges the census data in larger blocks—e.g., 34,000 larger blocks that sit on top of the mapping, district, and base census information. In some embodiments, each larger block includes approximately 2,500 people. One reason for regrouping the census data is to make the solution and message delivery more manageable. In some embodiments, message targeting may be based on either zip code, cable television zone, or a Direct Marketing Area (DMA). A cable television zone is a unit that defines the individual households served by a cable television provider in a given geography. By using a DMA or cable zone, online ad campaigns can be combined with TV advertising to add value to traditional advertising packaging. DMA is a standard used in advertising and typically includes a predefined area around a power station (e.g., a 75 mile radius around a broadcast tower for television) or houses within, a cable subscriber zone. By using a DMA, online ad campaigns can be combined with TV advertising to add value to traditional advertising packaging. This standard for broadcast targeting has also been adopted to some degree in Internet advertising and communications. Cable companies maintain they own DMAs, such as the DMA for a given municipality or nearby municipalities. These areas may include portions that are in multiple Congressional districts, or cross other political boundaries. However, because each cable provider can control individual connections within its DMA (e.g., only proving active connections to subscriber drops that are in good standing), a cable provider can select individual households, or groups of households, to display an ad online or via TV, based on the known physical location of each broadband connection.

Voter registration information may also be included. Voter registration information may be useful for micro-targeting a segment within a district based on, for example, patty registration or other voter registration information that is available from voter records that may be available from the secretary of state for a given state. This information may include, for example, the party affiliation, the voting precinct and polling place, the age, frequency of participation in elections, years registered, marital status, etc. It will be understood that each state's voter registration is different, includes different information, and is presented in different formats. Where the voter registration is presented in a digital form, the registration can be reformatted and copied into a normalized format.

FIG. 5A illustrates an embodiment of a method for creating a national voter file (NVF) for use with embodiments of the present invention. At step 501, voter registration records are received, which can be obtained from various government record authorities, such as secretaries of state. These records do not all contain the same fields, such, as age, zip-code, etc., or may refer to these fields in different ways. In addition, the electronic format used by each state may not be the same. In some embodiments, other offline databases, not just voter registration, can be used. For example, a holder of a mailing list of people can make this mailing list available to introduce a cookie into the advertising environment that reflects membership and/or attributes of persons on that mailing list. Accordingly, at step 503, each record for each individual, voter is normalized and copied as a record in the NVF. To accomplish this, the fields from the state-supplied data, can be mapped, such as by schema, to normalized record fields in the NVF. Accordingly, each voter receives an entry in a normalized format, regardless of the format used by that voter's secretary of state. Additionally, the data in these files can be cleaned and formatted, such as by character mapping, schema, dictionaries, or the like. This can include padding missing fields in the record.

At step 505, any missing fields in the new record of the NVF is determined, and appropriate action, such as supplying a delimit value or padding the field with a null or zero value. Additionally, at step 505, values not explicitly in the record supplied by the state can be added, such as by a lookup table. For example, a State value can be supplied based on the state authority that supplied the original record; a voting precinct can reveal a zip code, etc. This record provides the basic political demographic information (PDI) record for an individual. This PDI can include the location, such as a residence, address, zip-code, etc, of the individual.

At step 507, third party data can be obtained to supplement the records in the NVF. In some embodiments, this includes census data that includes the address and zip code of a plurality of voters. In some embodiments, this data may include socio-economic or behavioral information that other vendors can supply. This can be through access to consumer databases, cookies, or other conventional means. At step 509, records are updated to reflect any new field information that has is available for the record. Any new fields that are absent for an individual voter are padded in accordance with step 505. In some embodiments, this third party data can be used without including it in the NVF. For example, in some embodiments, one can lease access to third party cookies, such that the correlation of NVF and third party information can be made by the presence of NVF cookie 118 and a third party cookie on the voter's computer. At step 512, the NVF is introduced into the advertising ecosystem explained in FIG. 2. The NVF can be treated similar to other consumer records 140 and the PDI can be made available to advertisers that partner with the keeper of the NVF. This can include providing/transmitting/making the records available to a DMP for association with a cookie used, to later associate a voter's browser with the PDI.

Figure 5C:
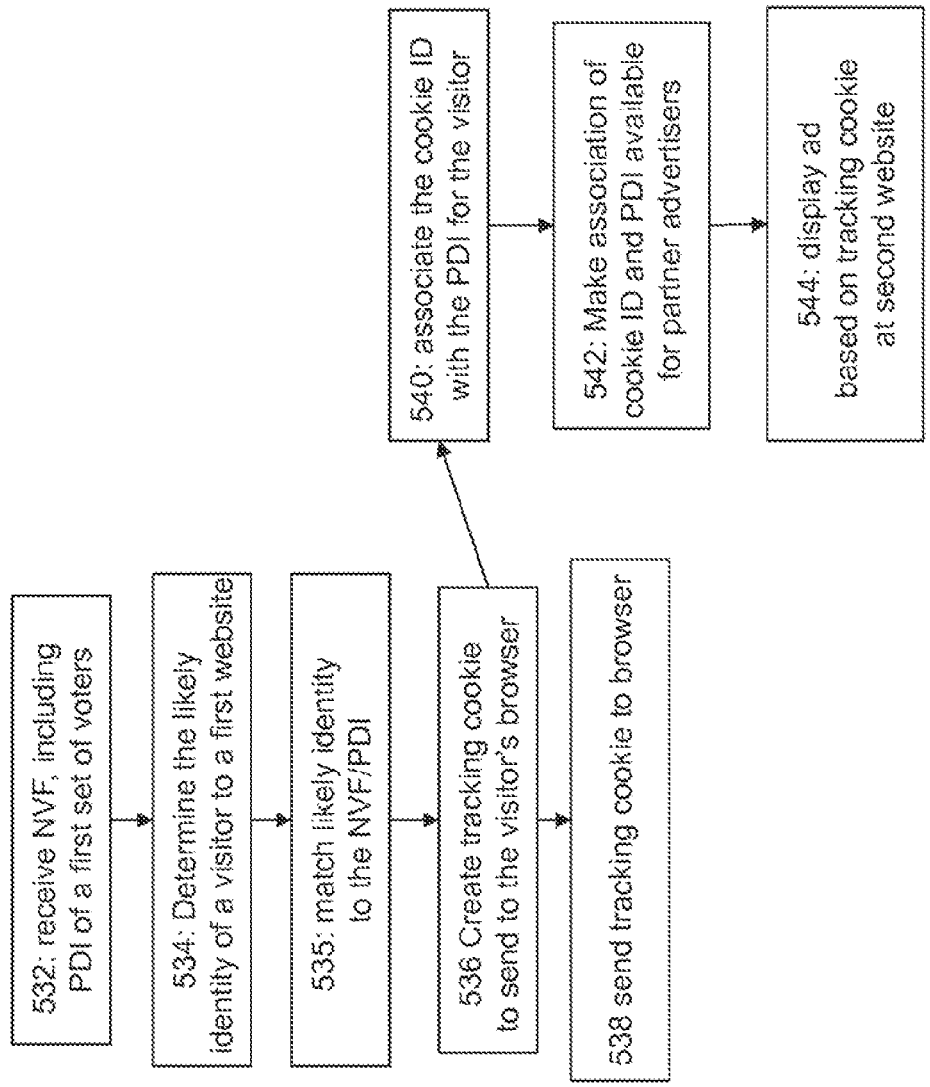

FIG. 5B shows a higher level illustration of the use of offline database information, such as voter registration information. To begin, the system, takes an offline voter file or a member list at step 522. This data can be made part, of an NVF. Once the NVF is created, a DMP or other parry that knows the identity of a person browsing the web, such as a voter can be used at step 524. This DMP matches the list or NVF to the identity of the person browsing. This person can be called the user of the web browser. It should be appreciated that the user of a browser can, include a household, as the actual identity of a person using a browser at any moment may not be knowable. Furthermore, the identity of the user may not be absolutely knowable, as a user can be identified by computer information and/or login information, which can be shared, stolen, or usurped. Accordingly, it should be understood that the identity of a user may refer to the likely identity of a user. The association of a browser to user information can be done anonymously such that the rest of the ecosystem, including a DSP and the supplier of the list do not actually learn the identity of the web user. That is, demographic information about the user, such as political affiliation, or other non-personally identifiable information from the record is matched to the ID of a tag, such as a cookie, that is provided or affiliated with the user's web browser or computer. The association of that ID or tag to the demographic information can then be shared with other parties in the ecosystem without revealing personally Identifiable information. That is, the data matching partner, such as a DMP, informs other parties that the person is on a list or has certain demographic attributes, but does not reveal that person's identity as she browses the web. This allows advertisers to use that association to easily identify whether a person meets demographic criteria and target ads to them without knowing that person's identity. This process is shown in more detail in FIG. 5C.

The data matching partner, such as a DMP, informs other parties that the person is on a list or has certain demographic attributes, but does not reveal that person's identity as she browses the web. This allows advertisers to use that association to easily identify whether a person meets demographic criteria and target ads to them without knowing that person's identity. In some embodiments, this step includes placing a cookie on a user machine having a unique ID that can be looked up by advertising partners to reveal PDI, such as the user's Congressional District, but not personal identifiable information. In some embodiments, each browser for which a DMP can find an entry in the NVF receives a cookie that the DMP associates with the entry in the NVF. In some embodiments, tire DMP creates a new entry for the cookie ID, and correlates it with a group of non-personally identifiable demographic information, such as district and age.

At step 526, when a user's browser visits a content website associated with a data matching partner having access to the cookie, the data matching partner (DMP) will inform the ecosystem that a browser has a cookie associated with the NVF. In some embodiments, the data matching partner performs a step to apply an advertiser's selected criteria from the NVF to create a list of cookie IDs that match, before a user's ad impression becomes available for bidding. The advertiser that wishes to then bid on the ad impression to serve an ad, needs only to check the predetermination by the DMP. In some embodiments, the DMP cart check whether the user matches the criteria for candidates of the ad by looking up demographic information from the cookie ID at the time of the ad impression. In these manners, a data matching partner allows ads to be sent to users based on whether that user's demographic information matches an ad's filter criteria, without telling the advertiser who the user is, or delivering any personal information. For example, in the example shown in FIG. 5B, users residing in the $6^{th}$ district are matched by the data matching partner. A vendor wishes to bid on an ad impression for impressions that meet the message criteria to selectively display the advertising message. The DMP can maintain a list of all cookies that match the criteria. At step 528, when individuals match the list of cookies meeting the filter criteria, a vendor can bid on the advertising impression available for a browser having that cookie and visiting a content website. At that time, a message can be served by a content site. This process is shown in detail in FIG. 5D.

As shown in FIG. 5C, a DMP can place a cookie on a voter's browser to allow subsequent advertisements, to be displayed to the voter. At step 532, the DMP receives the NVF or other records that associate the identity of individual constituents/voters to the PDI for each constituent/voter. At step 534, the DMP determines the likely identity of a visitor to a first website. For example, the DMP can determine based on login information, the likely identity of a voter, such as his name and address. At step 535, the identity of the voter visiting the first website is compared to die NVF or other records to match records to the voter at the website. This allows an association of the visitor with the PDI in the records.

At step 536, the DMP creates a tracking cookie to send to the voter's browser, who is visiting the first website. This cookie can be used to associate the voter's browser to tire PDI of the voter (or a subset thereof). This subset of PDI can include any PDI but in some embodiments, it includes at least the voting district of the voter and/or the location of the voter. This cookie includes a unique ID that can be used to look up the associated PDI when the cookie appears at a second website. In some embodiments, the identity (or other personal identifiable information) is not associated with the cookie ID. Therefore, the cookie cannot be used to determine the identity of the voter. It will be appreciated that some embodiments could be contemplated that include such an association—where allowed by law. At step 538, the tracking cookie is sent to the browser of the voter/visitor.

At step 540, the DMP creates an association between the cookie ID and the PDI of the voter. This can include a record in a database. At step 542, the association of cookie ID and PDI is shared with partner advertisers. This can include sharing a database with partners that include a record for each cookie ID and the PDI as fields in the record.

At step 544, partners can use the cookie ID of a browser to look up the associated PDI when the tracking cookie appears on a browser visiting at a second website. Then, an ad message can be displayed to that visitor at the second website.

Figure 5D:
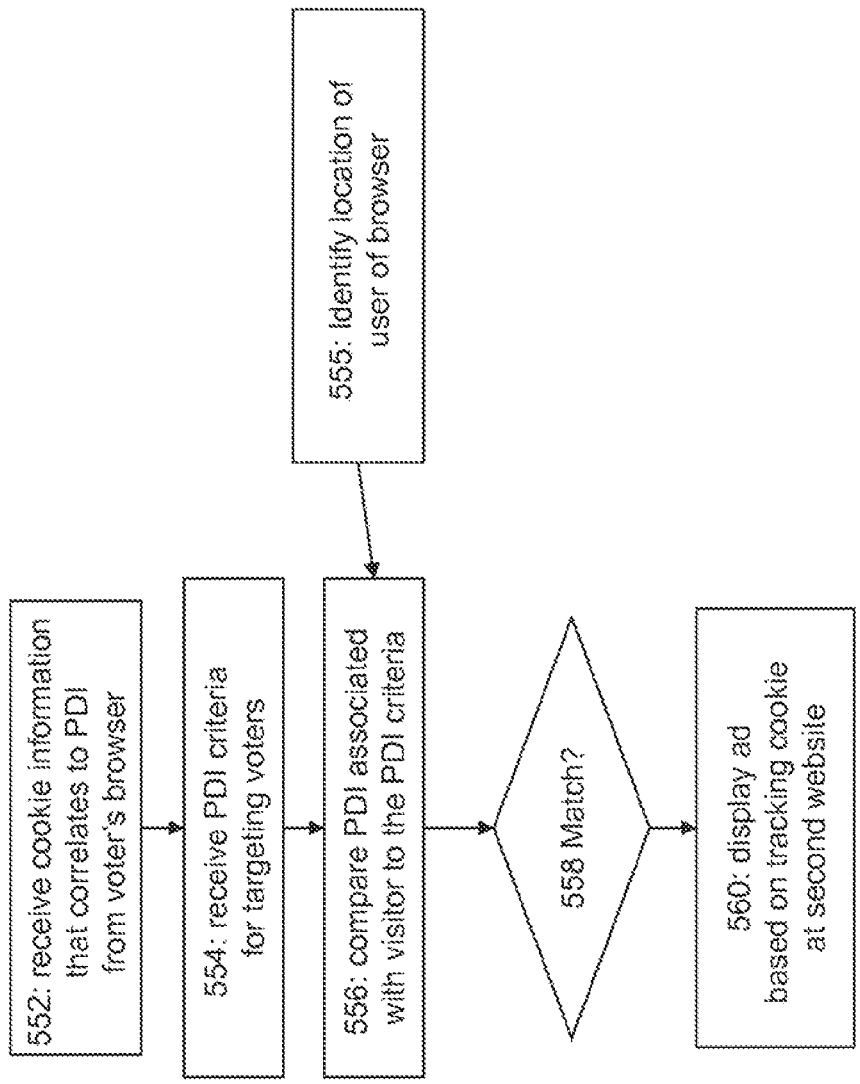

As shown in FIG. 5D, at a second website, such as a content website, an ad partner can display a message to a voter that visits that website based on cookie information or the location of the browser of the voter. At steps 552, if the browser of a visitor includes a cookie, such as that discussed with respect to FIGS. 5A-C that can be correlated to PDI of the browsing voter, the cookie is sent to the second website. This cookie can include cookie information, suck m a unique cookie ID that correlates to associated PDI, as described in step 540, which may previously have been performed by a DMP at a first website. This cookie information can be sent to a matching partner, such as a DSP. The PDI associated with the cookie can be called a first set of PDI. This can be obtained by looking up the record for the cookie on the visitor's browser.

At step 554, the second website (or DSP) receives the desired PDI for targeting voters. This desired PDI can be called a second set of PDI it may be provided by an advertiser and include information, such as the voting district of targeted voters.

In some embodiments, at step 555, the second website identifies the current location of a voter browser visiting the website. This can provide alternative means to match a visitor to the targeted voters identified by the second set of PDI. For example, the IP address of the browser or phone number of a mobile device can be used to associate the visitor with residing in a certain voting district. In some embodiments, where a voter is browsing via a mobile device, such as a smart phone, equipped with GPS, the GPS can be used to determine location, including the current district in which the mobile device is located. This can also be considered part of the first set of PDI, or an alternative set, in some embodiments.

At step 556, the first and second sets of PDI are compared. In some embodiments, only visitors that match all selected PDI in the second set will be candidates for receiving an advertising message. In some embodiments, PDI beyond voting district can be used to choose a bidding price rule for bidding on an ad impression. At step 558, if the first set of PDI (the PDI associated with a visitor) matches the second set of PDI (the PDI criteria chosen by an advertiser for displaying an ad), an ad impression on the second website matches the ad message criteria. In some embodiments, the result of the matching step will cause a bid to be placed on an ad exchange to bid a determined price for displaying the ad message to the voter visiting the second site. In some embodiments, there are degrees of matching that reflect whether the two sets of PDI are a complete or partial match. The degree of the match can affect the determined price to bid on tire ad impression.

At step 560, an ad message is caused to be displayed to a user via well-known means for internet advertising, such as including the ad in the data sent to a browser when a web page is loaded. In some embodiments, step 560 only occurs if a bid is successful on an ad exchange. It can be said that the message is displayed based on the result of the comparison step 558 (e.g., if no bidding-occurs or if the bid triggered by the match is successful on an ad exchange.)

Figure 6:
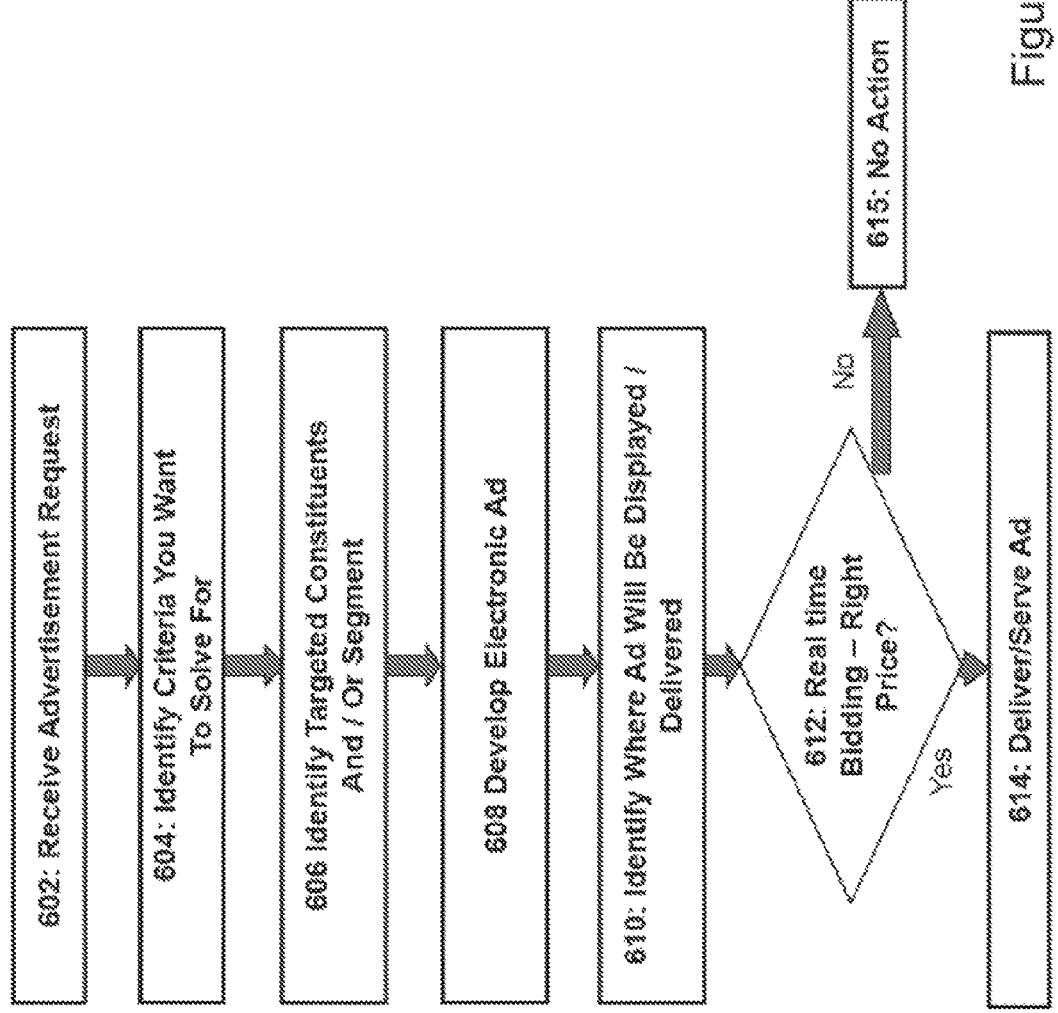
FIG. 6 is a flow chart showing exemplary processes for processing a request for targeting delivery of an online advertisement in accordance with embodiments of the invention.
Figure 7:
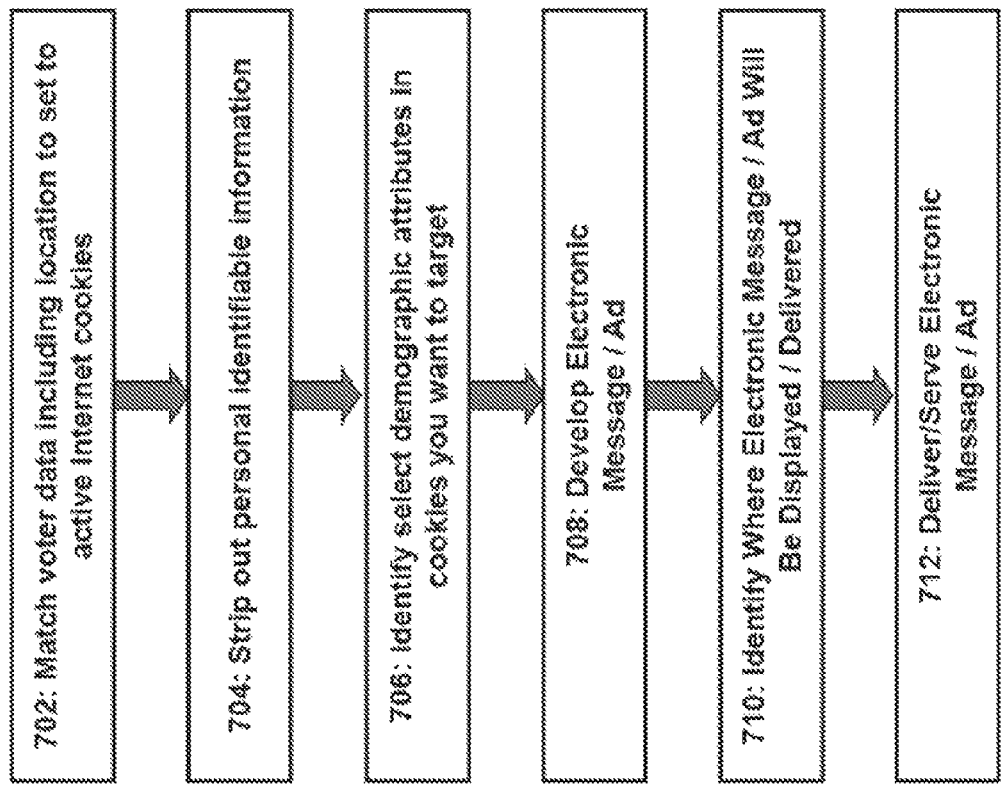
FIG. 7 is a flow chart showing exemplary processes for processing a request for targeting delivery of an online advertisement in accordance with embodiments of the invention.

FIGS. 6 and 7 show exemplary processes for generating and delivering targeted electronic and network-based advertisements. In some embodiments, targeting may be one to few based on geography. In some embodiments, targeting may be one to few based on geography and demographics. As shown in FIG. 6, at step 602 a request from an advertising client, such as a candidate, may be received. At step 504 the criteria (e.g., geographic and/or demographic) to be solved for are identified. At step 606, based on the criteria, the voters, or segment of voters will be identified by the method using the mapped data/information and the parameters of tire ad request. The result of this step can be conveyed to a developer of the message via a heat mapping tool, explained below. In response to a query of demographic criteria, the heat map tool can show visually the segment of the households that match the selected criteria. In some embodiments, a developer of a message can quickly guess-and-check between steps 604 and 606 iteratively to find the right mix of criteria for the message. An advertisement is developed. For example, the content, format, layout, message, etc., are determined. The website(s) to which the online ad will be delivered will be identified or selected. In some embodiments, the website selected to be used for the ad can be a website that is selected for a high incidence of traffic meeting the selected PDI criteria, such as a local newspaper. This selection can be automated by running a comparison of the selected criteria of individuals who should be shown the ad to traffic statistics from a partner website. For example, it may be automatically determined that a site such as huffingtonpost.com see less cookies meeting criteria for voters targeted by a Republican candidate than, for example, drudgereport.com. This statistical information can be provided by a DSP.

At step 608, once demographic criteria are decided, a message is developed. At step 610, the website(s) to which the online message will be delivered will be identified or selected. In some embodiments, the website selected to be used for the ad/message can be a website that is selected for a high incidence of traffic meeting the selected PDI criteria, such as a local newspaper. This selection can be automated by running a comparison of the selected criteria of individuals who should be shown the message to traffic statistics from a partner website. This statistical information can be provided by a DSP.

In some embodiments, once a message is developed, bidding for delivery of the message on online ad exchanges can occur, as many times as the message will be served.

At step 612, real time bidding may occur to determine a price for serving the ad as part of a single or multiple advertising impression packages on a website, such as a new page. If a price is agreed upon (e.g., the advertiser wins the bid to serve an individual impression in a real-time auction or an agreement before the site begins displaying ads), the advertisement is delivered to a voter's browser at step 614. If a price is not agreed to, then no action is taken message is not served at step 615. Step 612 can then repeat for each advertising impression that matches the selected criteria and the ad is not served. The ad may be delivered, for example, over the Internet, via HTTP. With advertisements, instructions and graphics/audio may be delivered to or pre-stored on an advertisement server to deliver the advertisement. The intermediate steps are not required to be performed in any particular order.

FIG. 7 shows another process for micro-targeting to match demographics (e.g., voter demographics) in the various data sets to active Internet cookies. This type of targeting is one to one. As shown in FIG. 7, the process may include matching the data set in the NVF or the preselected criteria to active Internet cookies on browser 100 (step 702). Personal identifiable information may be stripped out at step 704. At step 706, select demographic attributes/PDI may be identified in the cookies that will be targeted. At step 710: an electronic ad may be developed. At step 712, the site is identified or selected for serving and displaying the ad and the ad may be delivered/served. In some embodiments, cookies may be matched to data, such as geographic or PDI data. In some embodiments, cookies are anonymous and do not contains any personal identifiable information.

The use of cookies in certain embodiments allows for serving ads one to one based upon demographic revealed in the cookie. As explained throughout, a cookie may be dropped or installed on a voter's personal computing device when that person visits a particular site. The cookie data and this on-line tracking may then be used to identify/define demographic(s) for the targeted serving of ads. The system and method may monitor a site to wait for the person with certain demographics to show up (e.g., visit the site). Real time bidding in the display or advertising business may ensue in which if a bid is won an advertisement is displayed. For example, a decision tree may be included to allow real time bidding on an ad unit on a web-site (e.g., Weather.com). If the right person, (based on PDI) in the right location (geography) is identified, real time bidding process determines whether an ad will be served. Political ads may be bidding against, for example, ads for personal care products.

Embodiments of the invention may use different cookies. For example, tracking cookies and re-targeting cookies. In some embodiments, the cookie is a tracking cookie and is merely used to identify that a voter has visited a particular site, and that's it. This type of cookie may be used for list building so that the next time an ad impression is available for this voter, ads may be chosen more efficiently. For example, if X number of people visit the site of a candidate's site, the advertiser may choose to only target political ads to those people. For example, Y number of people visited a site on a particular issue, the advertiser may choose to only target political ads to those people FIG. 8 shows exemplary data sources $DS_1$-$DS_n$. Data and other information included in the data sources may be used for data driven advocacy. The advertising system, is used to match a message, target and delivery channel for maximum efficiency in an online ad campaign. As shown in FIG. 8, the data sources may include an electoral data source $DS_1$, a consumer data source $DS_2$, a social data source, $DS_1$, a demographic data source $DS_4$, an economic data source $DS_5$, an intent data source $DS_6$, lifestyle data source $DS_7$, a behavior data source $DS_8$ and a geographic data source $DS_9$. The electoral, data source $DS_1$ may include, for example, information, such as vote frequency, partisanship, age, gender, issue identification, volunteer, contributor, and the like. The consumer data source $DS_2$ may include, for example, information such as credit lines—premium/specialty, household income/wealth, investor capacity, etc. The social data source $DS_3$ may include information derived from a social media website such as Facebook or LinkedIn. The demographic data source $DS_4$ may include, for example, information such, age/life style, occupation, presence of children, ethnicity, household composition, etc. The economic data source $DS_5$ may include, for example, information such as home value, home equity, financing type, net worth, head of household income, and the like. The intent data source $DS_6$ may include, for example, information such as search term, histories, website browsing patterns, and the like. The lifestyle data source $DS_7$ may include, for example, information such as purchasing patterns, online activity, market channel responsiveness, affinity groups, etc. The behavioral data source $DS_8$ may include, for example, information such as charitable giving, employer, avocation, interests, etc. The geographic data source $DS_9$ may include, for example, zip codes, latitude/longitude, census blocks and tracts, cable zones, DMA and radio zones, etc. These data sources can be obtained and formatted as explained with reference to FIG. 5A and conglomerated in the NVF.

FIG. 9 shows further features of targeting messages to voters. As shown in FIG. 9, the individuals in the target universe may be arranged as desired, and in any way necessary. For example, as shown the individuals may be arranged by demographic data and geographic data. The demographic data was described above with reference to FIG. 8. As shown, the geographic data may include or be defined by market, state, county, congressional district, state legislative district, zip code, census block, etc. The geographic data may all be mapped, as described above and as shown below with reference to FIGS. 12-15. The demographic data, such as PDI, is linked or associated with the geographic data. The advertising system allows micro-targeting of voters in a district or a segment sharing one or more demographics. An ad is delivered in a selected format via a selected communication channel to one or more selected sites. Geographic data can include GPS coordinates of voters.

Figure 10:
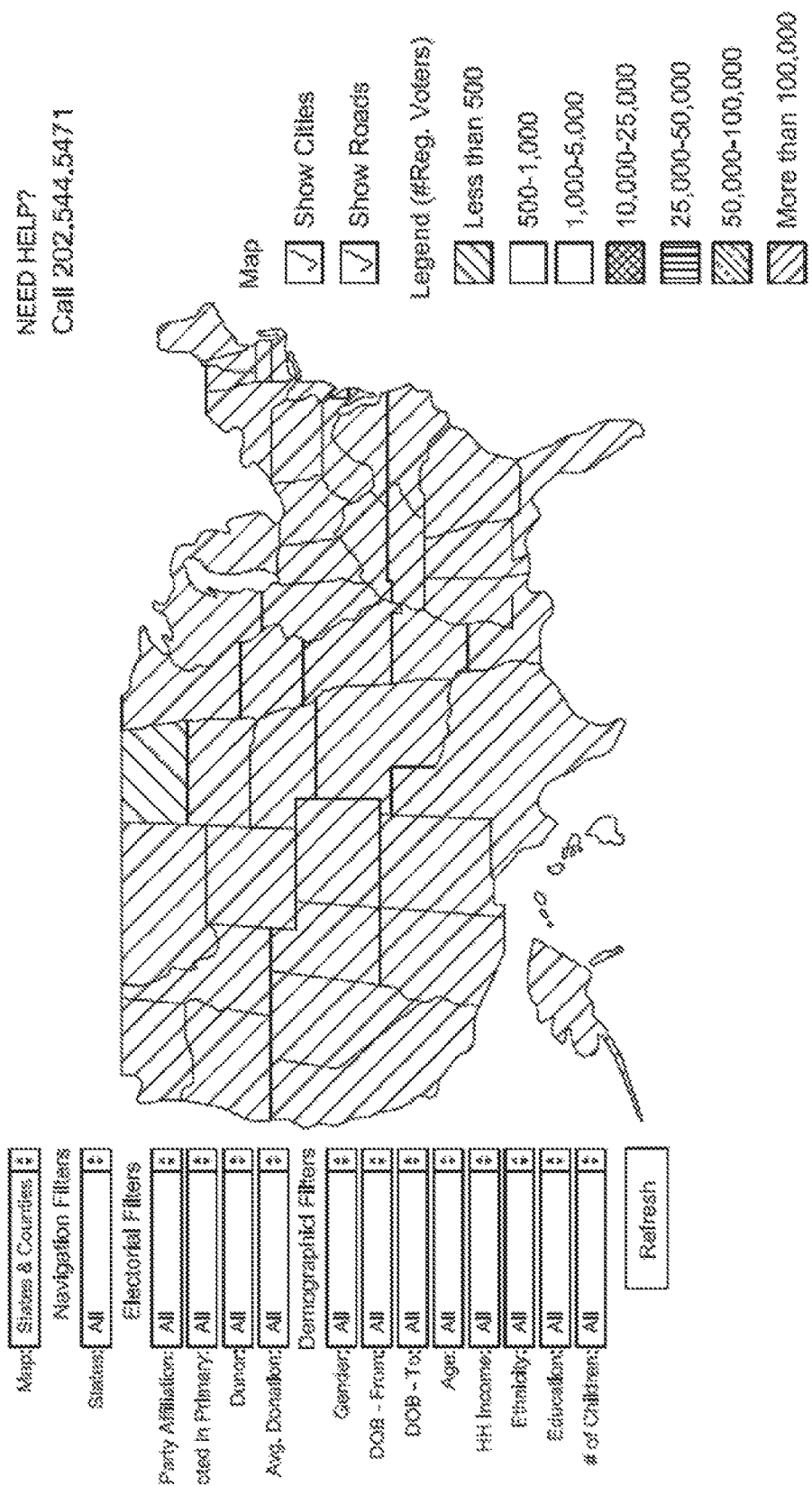
FIG. 10 shows an exemplary user interface for use with embodiments of the invention to assist in targeting individuals.

FIG. 10 shows an exemplary interface for selecting the criteria for targeting voters, including a map to select location. Criteria can include location, party, whether the voter voted in the primary, donor status, gender, age and date of birth, income level, ethnicity, religion, education level, marital status, and number of children in a household. It will be appreciated that each of these available criteria are optional depending on the embodiment. For example, many embodiments do not include party or donor status to avoid partisan ethics issues.

Figure 11:
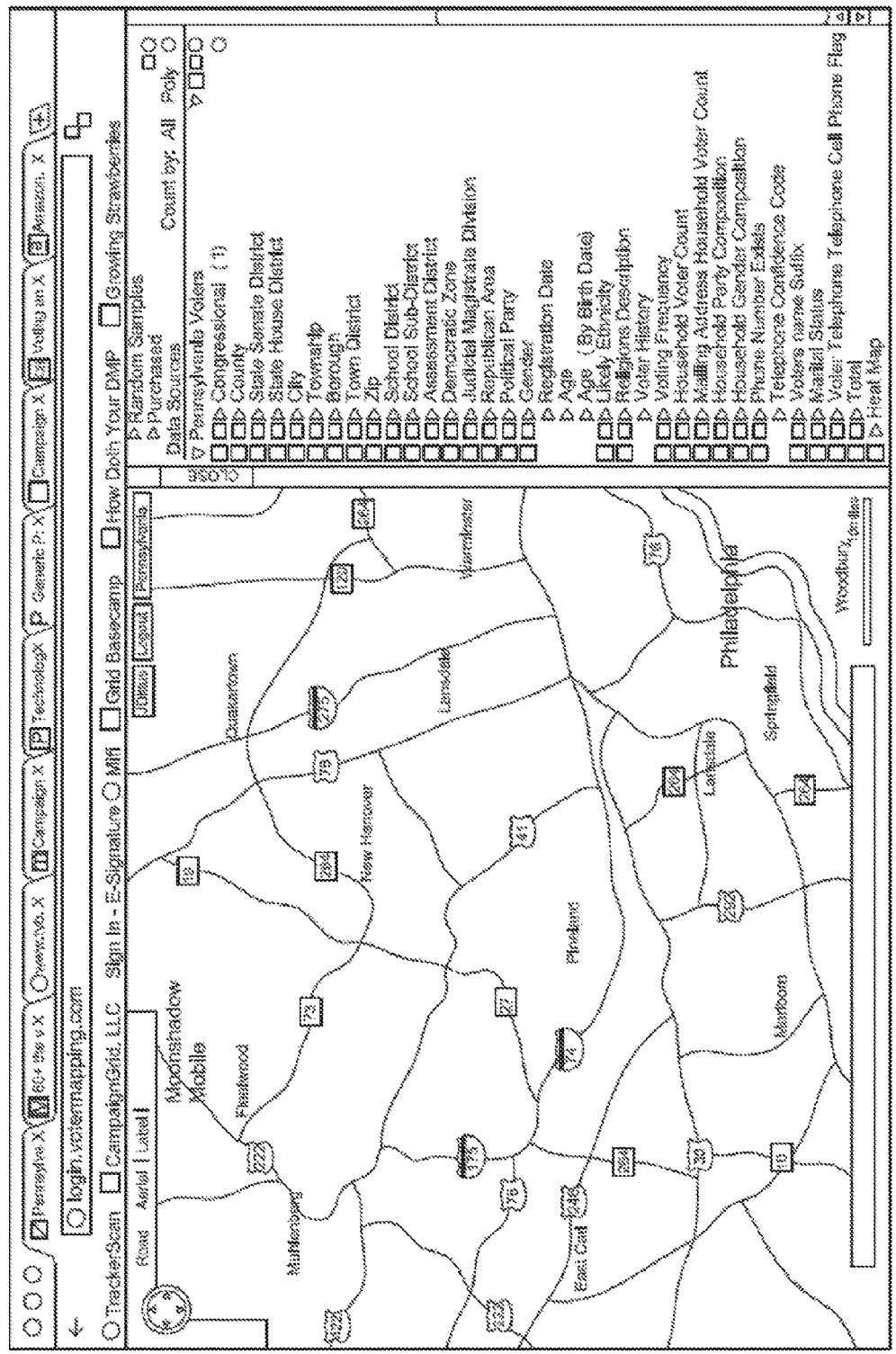
FIG. 11 is a sample screen that may be used by an advertiser using the national voter file to select and target groups of voters.

As shown in FIG. 11, a web based map interface allows targeting to be performed on a many user selectable levels, allowing the user (i.e., the person designing the message) to zoom in and select any number of geographic criteria. As shown, targeting can be by state, congressional district within a state, state senate/house boundaries, city, township, borough, town council district, school district/sub-district, tax assessment district, or democratic polling zone. In addition, any number of PIll criteria can be selected depending on the embodiment, within the geographic bounds selected to increase targeting. This can result in die display of a heat map that indicates the effectiveness of targeting within a region, such, as color coding that shows numbers or percentages of people being targeted within a region. When fully zoomed, the effectiveness of the PDI criteria selected can be viewed on a block or household level (where based on publicly available information, such as voter registration data, census data, and opt-in reporting).

Figure 12:
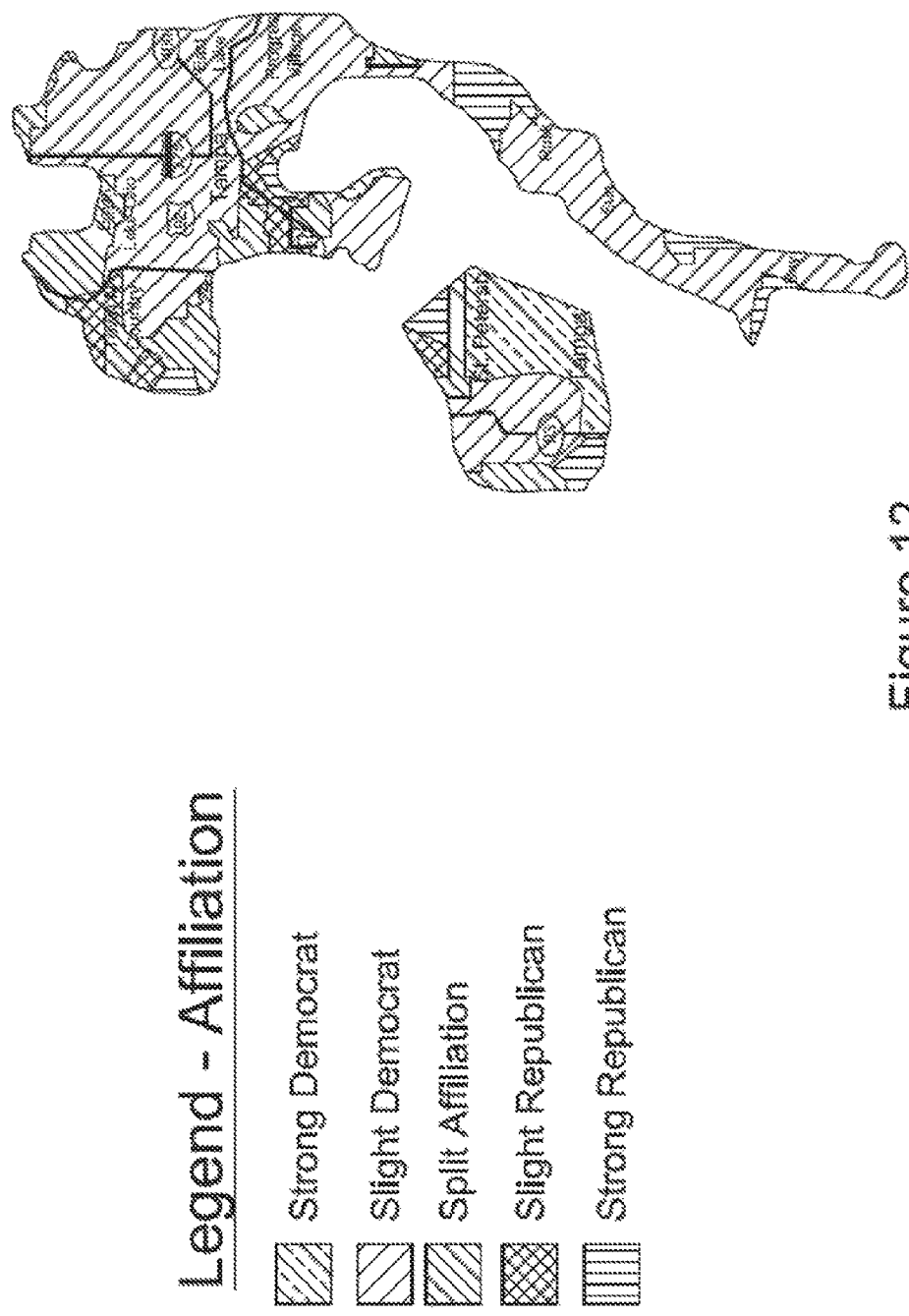
FIG. 12 shows an exemplary map of voters by party.

As shown in FIG. 11, the developer of an ad can select 1) location information including state, zip, precinct, etc. In some embodiments, the developer of an ad can also select one or more of 1) socio-political demographic information such as party, gender, age, religion, ethnicity, and absentee status; 2) voting history, including which elections a voter has voted and frequency of voting; 3) other voter political information that may be available, such as union affiliation, donor status, membership in active groups, etc.; and 4) personal demographic information, such as likelihood to invest, causes to which die voter belongs, political interests such as the environment, family status, such as having kids, an occupation, or other information that may be available from third party data sources based on information collected from other online sites. Selecting this information can allow the display of heat maps or the selection of criteria for selecting an ad to be displayed to individuals meeting the criteria. In some embodiments, this interface can be presented to a user via a web portal FIG. 12 shows one example of a map generated by the present invention showing a voter heat map for Florida—11$^{th}$ District with voters by party and strength of affiliation with the party. This political information could be used for other related systems, including, for example local officials or used for political campaigns. Many other possible PDI criteria can be excluded from the NVF and the targeting tool, such as race, gender, sexual orientation, or religion, to avoid discrimination, or even, the appearance that the system could be used for discrimination. Meanwhile, some embodiments recognize the importance of using PDI to target relevant voters, such as gender or race.

Figure 13:
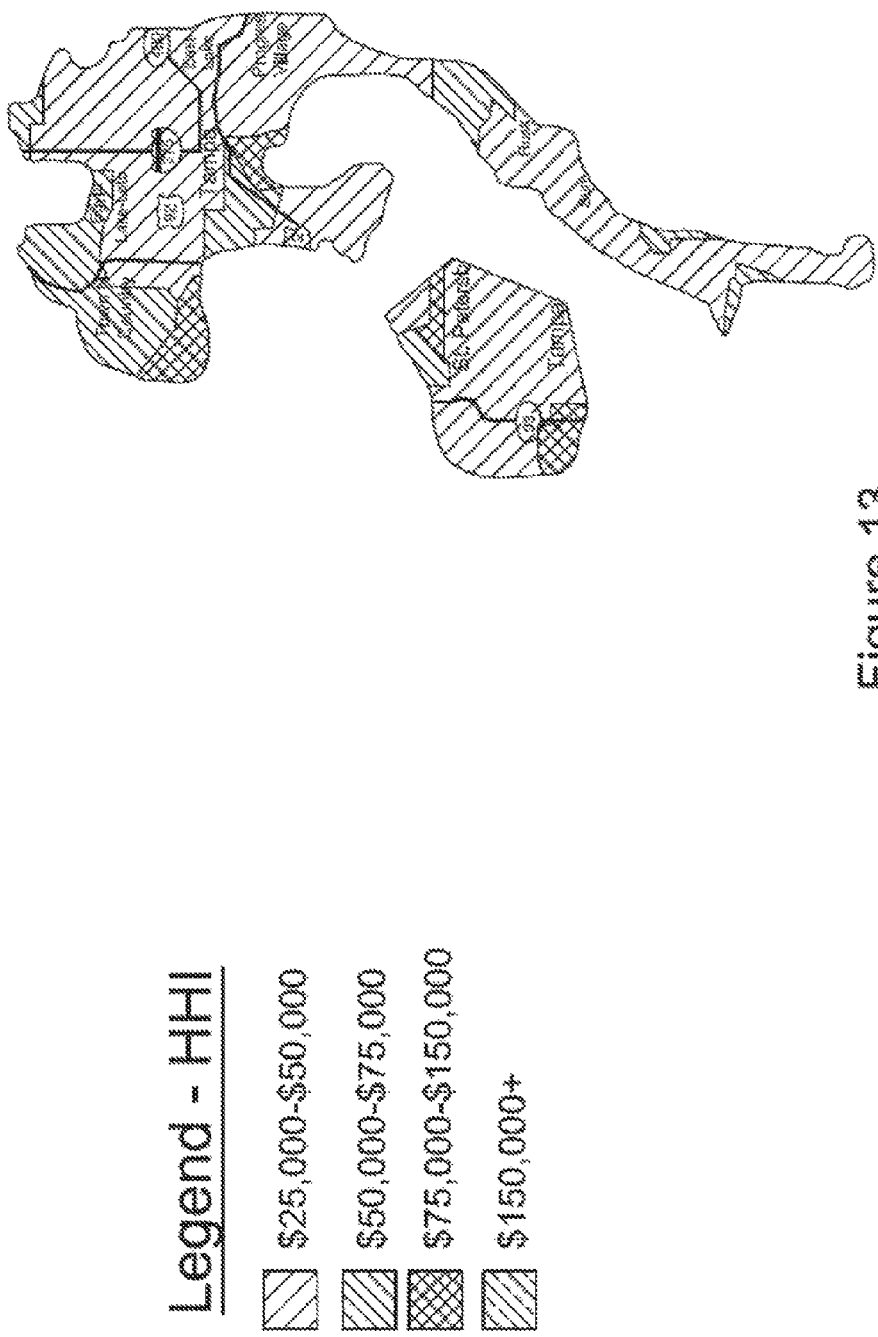
FIG. 13 shows an exemplary map of voters by household income.
Figure 14:
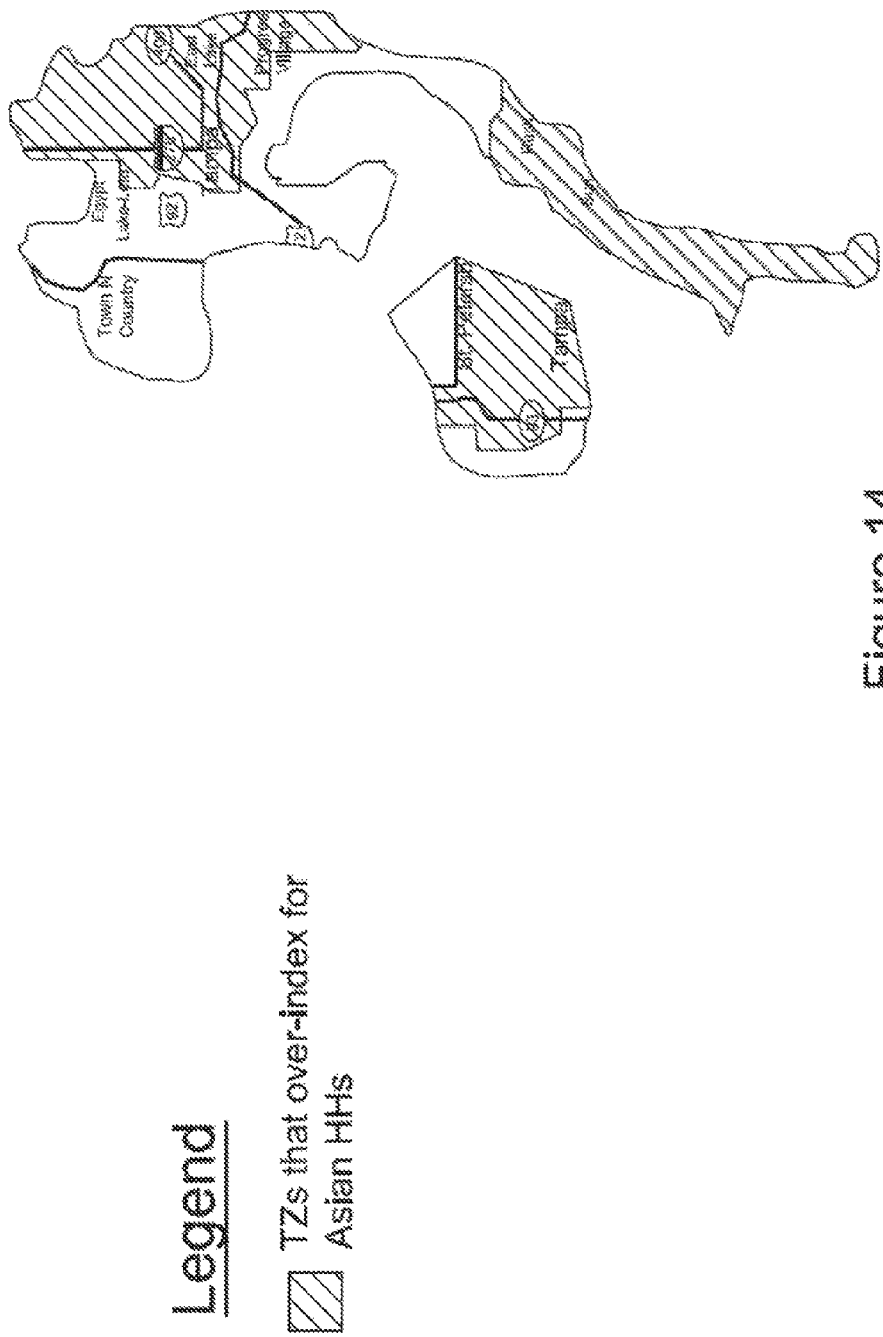
FIG. 14 shows an exemplary map of voters by African American households.
Figure 15:
FIG. 15 shows an exemplary map of voters by Hispanic households.

FIG. 12 shows one example of a map generated by the present invention showing a campaign, heat map for Florida—11$^{th}$ District with voters by party and strength of affiliation with the party. FIG. 13 shows another example of map generated by the advertising system showing a campaign heat map for Florida—11$^{th}$ District with head of household income ranges. FIG. 14 shows one example of map generated by the present invention showing a campaign heat map for Florida—11$^{th}$ District for African American households and FIG. 15 shows Hispanic households for the same district.

Figure 16:
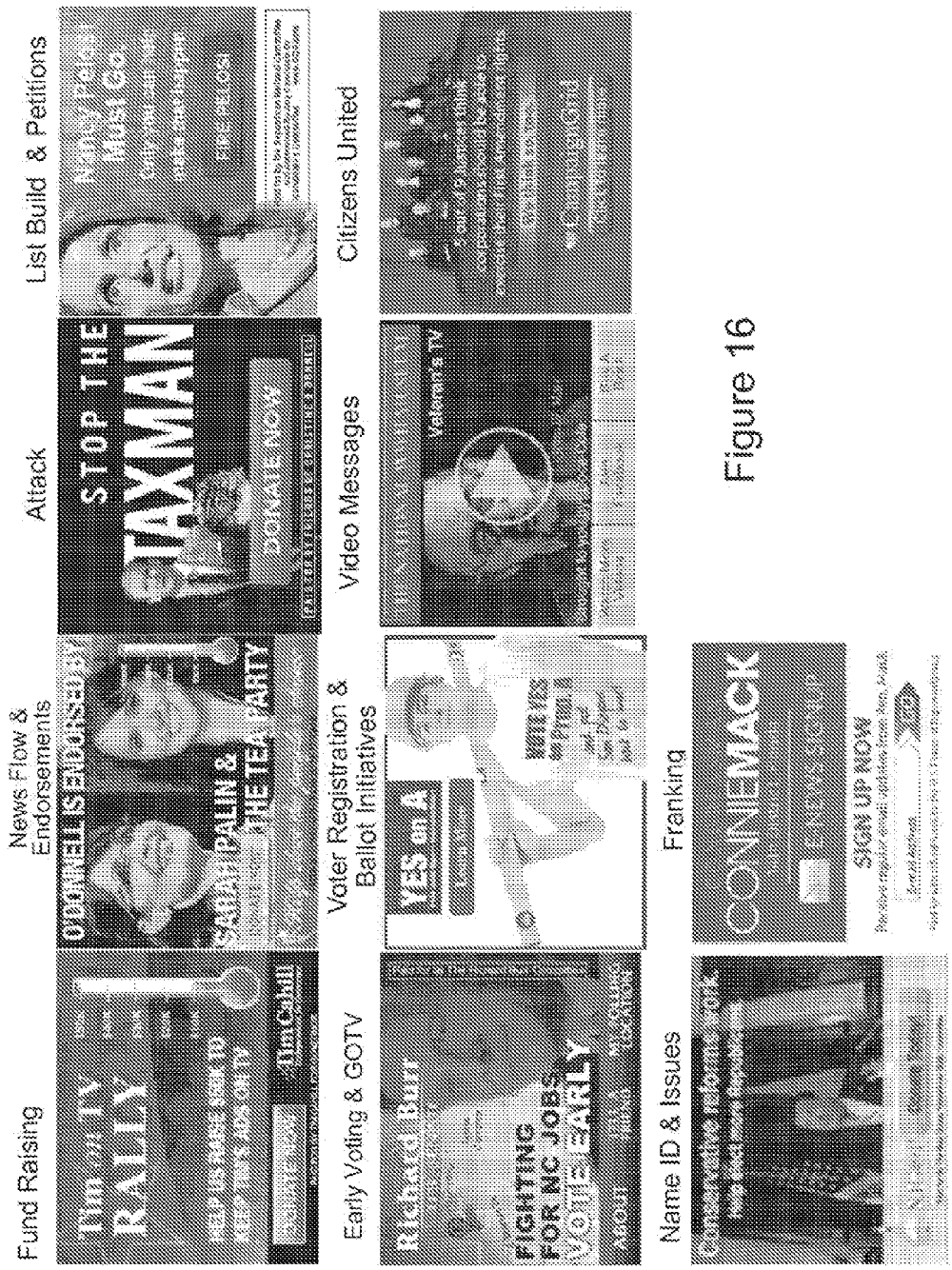
FIG. 16 shows exemplary advertisements.

As shown in FIG. 16, message/advertisement may be output or delivered in various forms or formats, such as text, banners, video, text over video, etc. Banners, for example, may come in various shapes, sizes, and orientations and may be customized based upon the message content, where the banner will be place in a website, etc. For example, banner advertisements may be square or rectangular shaped. For example, banner advertisements may be 300×250; 728×90; 128×600; etc. (width×height) with a substantially horizontal or vertical orientation.

Figure 17:
FIG. 17 shows an advertisement in the context of a webpage.

The advertising system allows for flexible messaging. FIG. 17 illustrates an example of an ad within the context of a page, in this example, a news item for an incumbent can result in the display of an ad for his opponent. This can be done by selecting keywords for pages to display appropriate ads.

As shown in FIG. 18, the advertising system may also be used for list building. As shown, a banner may be selected or developed, a site may be selected, the banner is delivered, the banner may include a sign up feature, interested users viewing the banner message may select to sign up, and the sign up process involved the users providing certain information, such as personal or identity information and contact information. Personal or identity information may include, for example, name, address, gender, race, occupation, income range, political affiliation or party, hobbies, interests, and the like. Contact information may include address, email address, IP address, telephone number, and the like. Signing up may allow the user to electronically follow a candidate, or issue or cause. When a user signs up, the information provided by the user may be used to build an email list, for example, for the candidate. The email list may be used at a later date to target the user based on the user information submitted. In other embodiments, the user may friend the candidate on Facebook. The system may also provide metrics to measure the effectiveness and use of the ads. For example, it may measure how many people view an ad per impression, when users click on an ad and go to a particular site, how many people sign op to a site, etc. Standard techniques for measuring impressions, clicks, etc. may be used.

Figure 19:
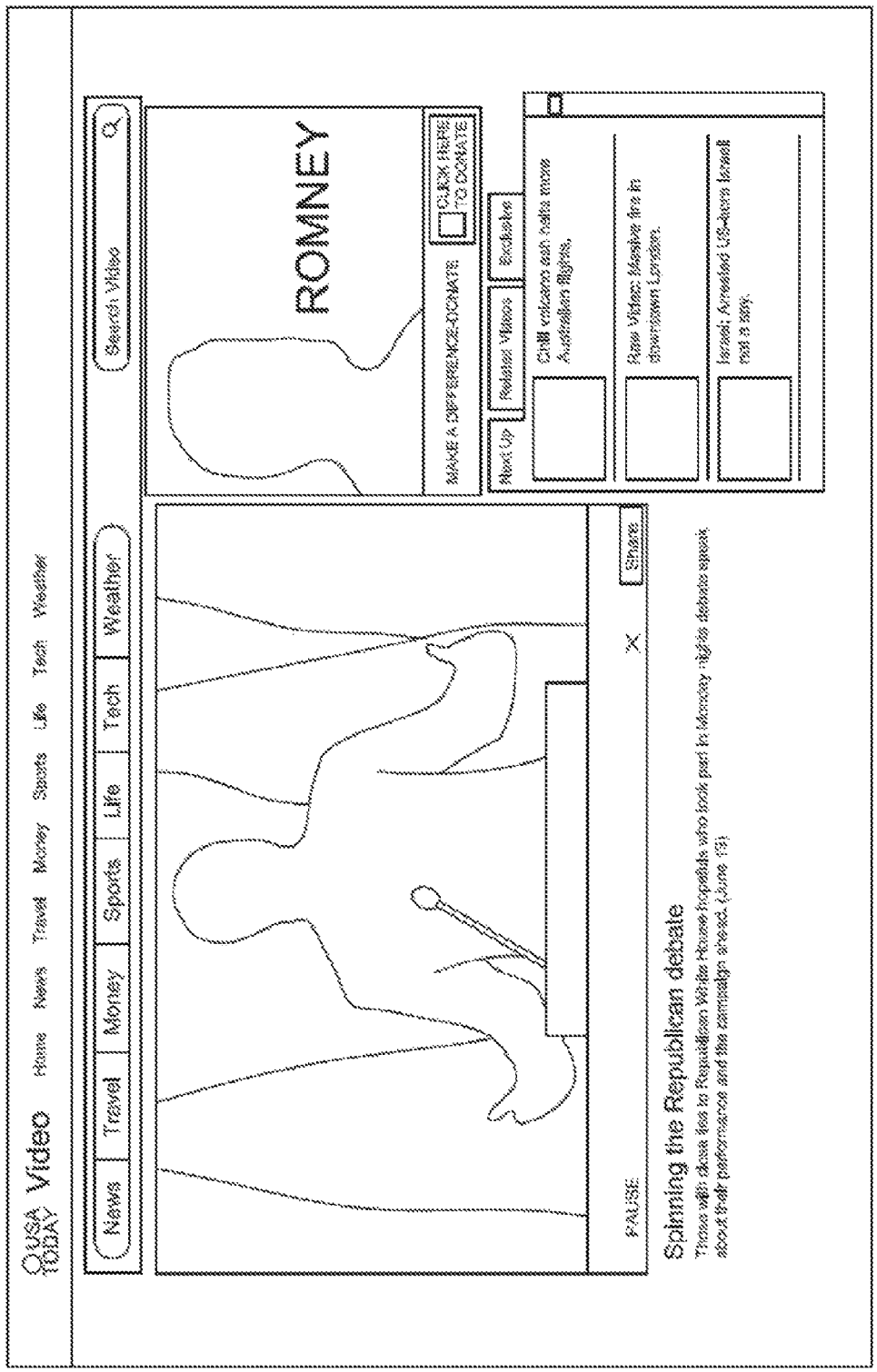
FIG. 19 shows exemplary sample video advertisements.
Figure 20:
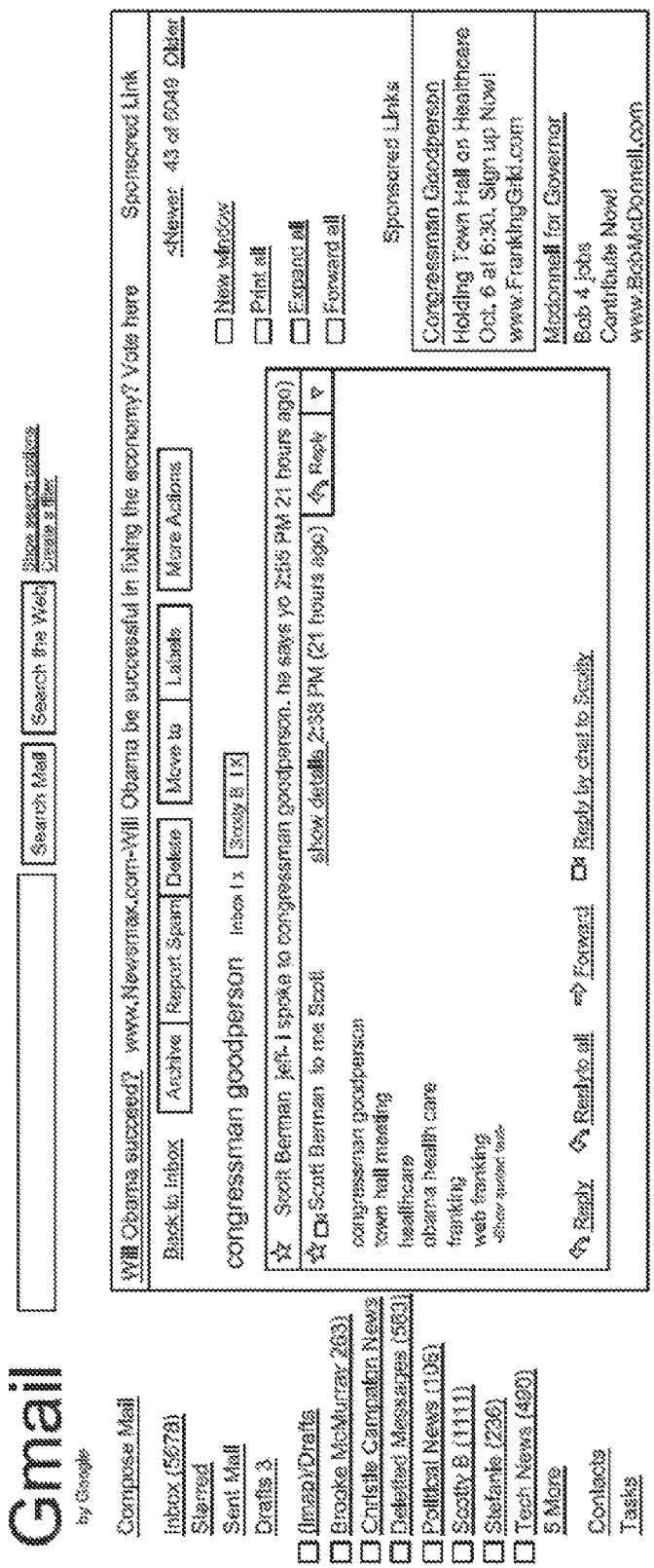
FIG. 20 shows exemplary Gmail advertisement for Congressman good person.

FIG. 19 shows an example of placing advertisements into videos that are viewed online, such as Youtube.com videos. Video ads can be displayed before, after, or during the viewing of other video content. FIG. 20 shows an exemplary Gmail search. Embodiments of the present invention may use key words and text advertisement help ensure link to the proper page of a candidate's official web site.

Figure 21A:
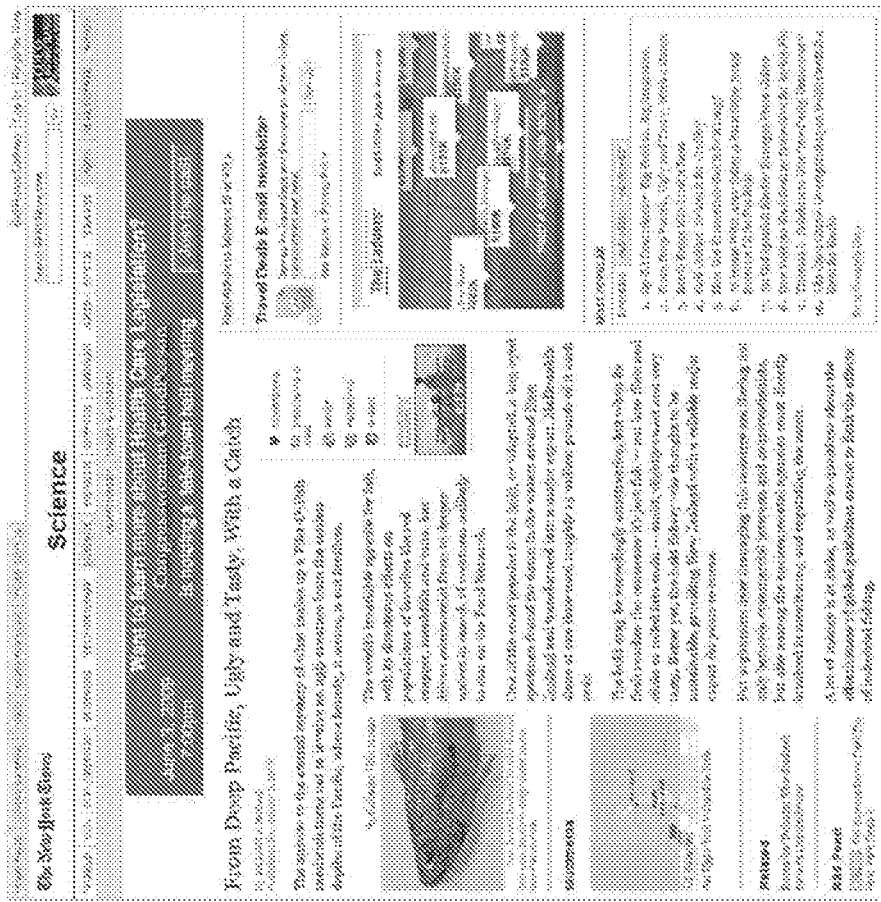
FIGS. 21A through 21B show exemplary advertisements.
Figure 21B:
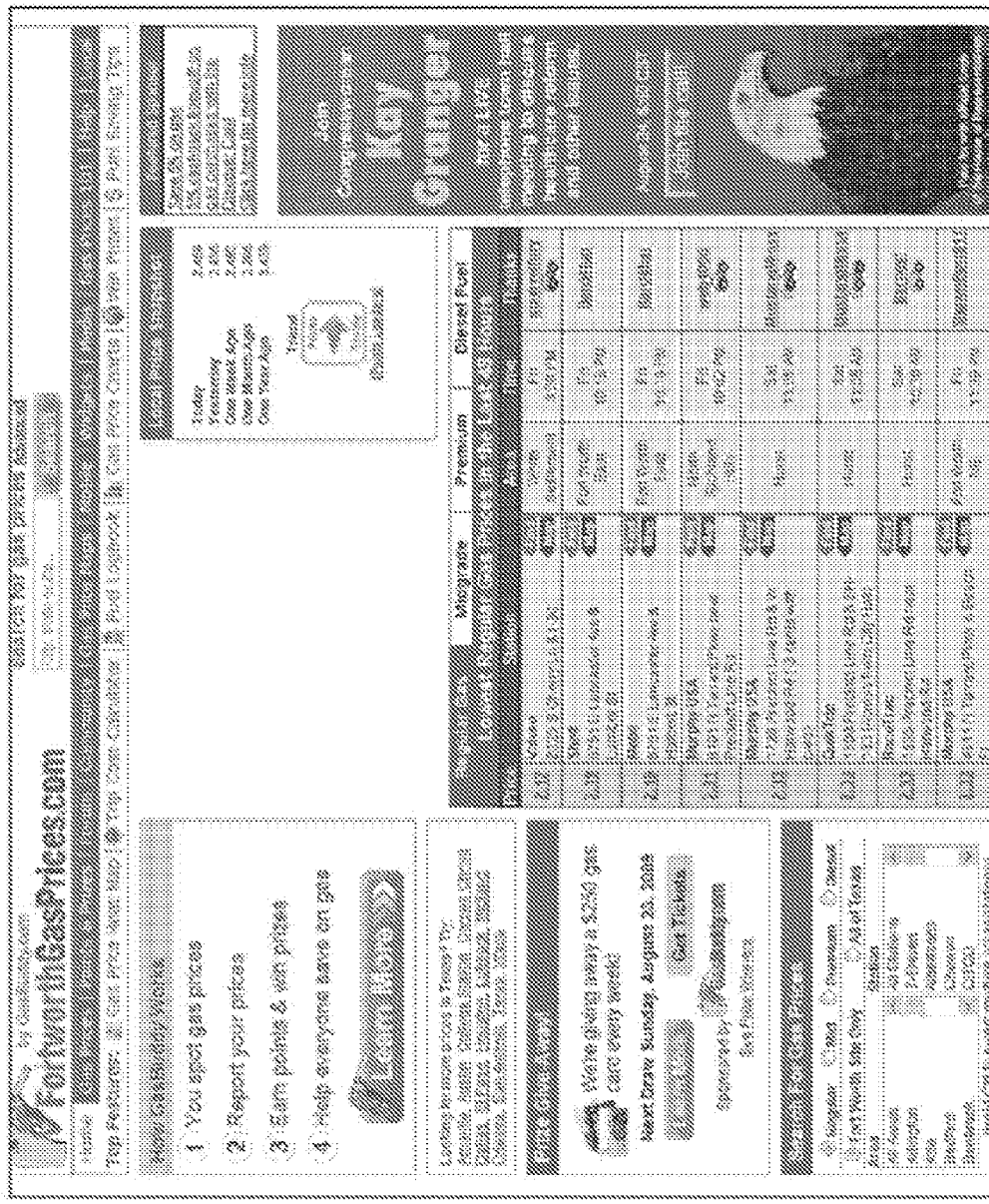

FIGS. 21A and 21B show exemplary advertisement. FIG. 21A shows an exemplary contextual advertisement on The New York Times Science web page (e.g., national news). FIG. 21B shows an exemplary geo/contextual advertisement on the Fort Worth Gas Price web page (e.g., local news).

Figure 22:
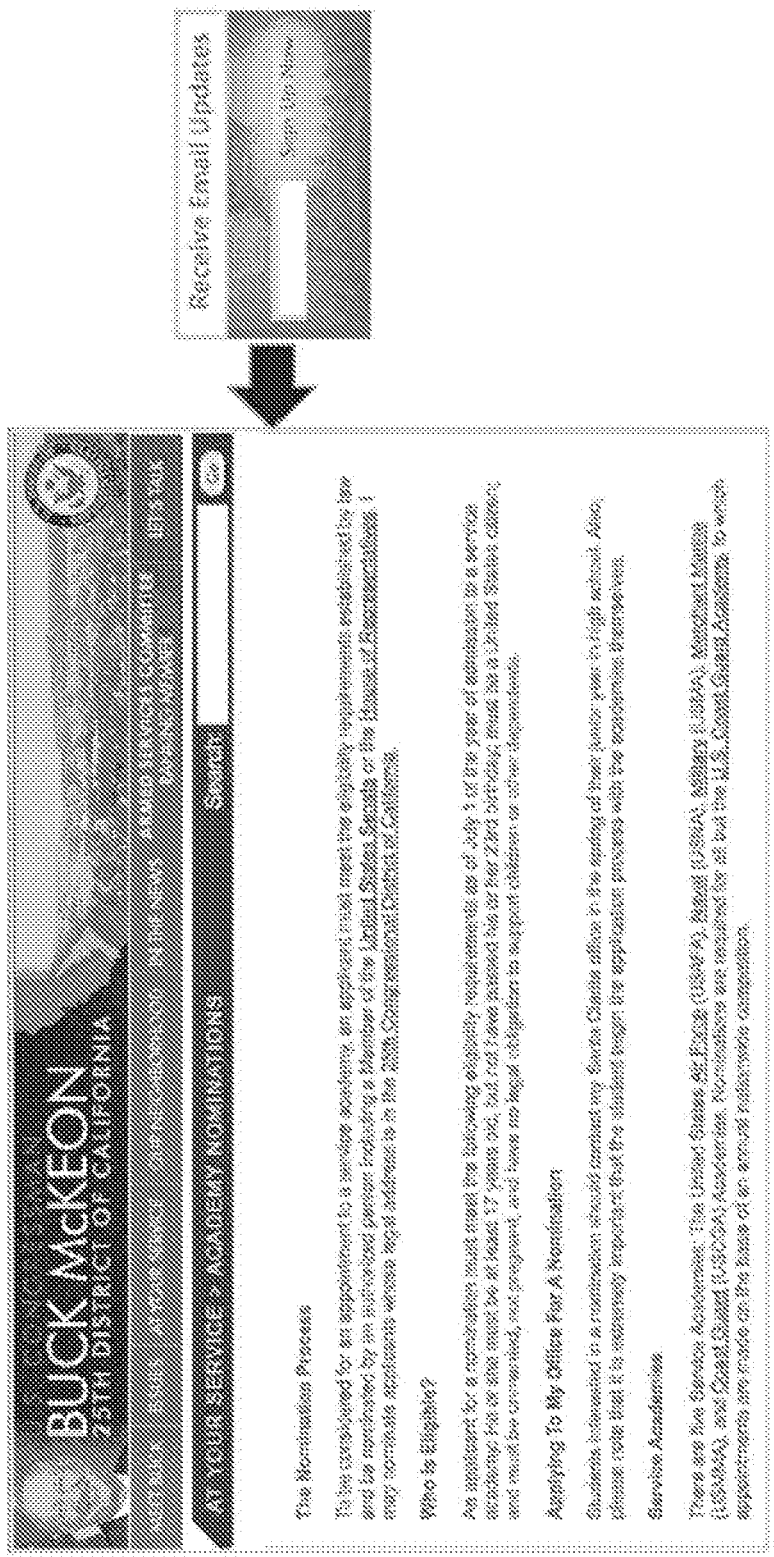
FIG. 22 shows an exemplary landing page.

FIG. 22 shows an exemplary landing page. For example, when a voter clicks on an advertisement, it calls up the landing page relevant to that advertisement. The illustrated landing page is for U.S. Congressman McKeon from the 25$^{th}$ district of California and includes academy nominations and an email sign-up feature.

Figure 23A:
FIGS. 23A-23F show exemplary banner advertisements in context and placement of the advertisement on a web site.
Figure 23B:
Figure 23C:
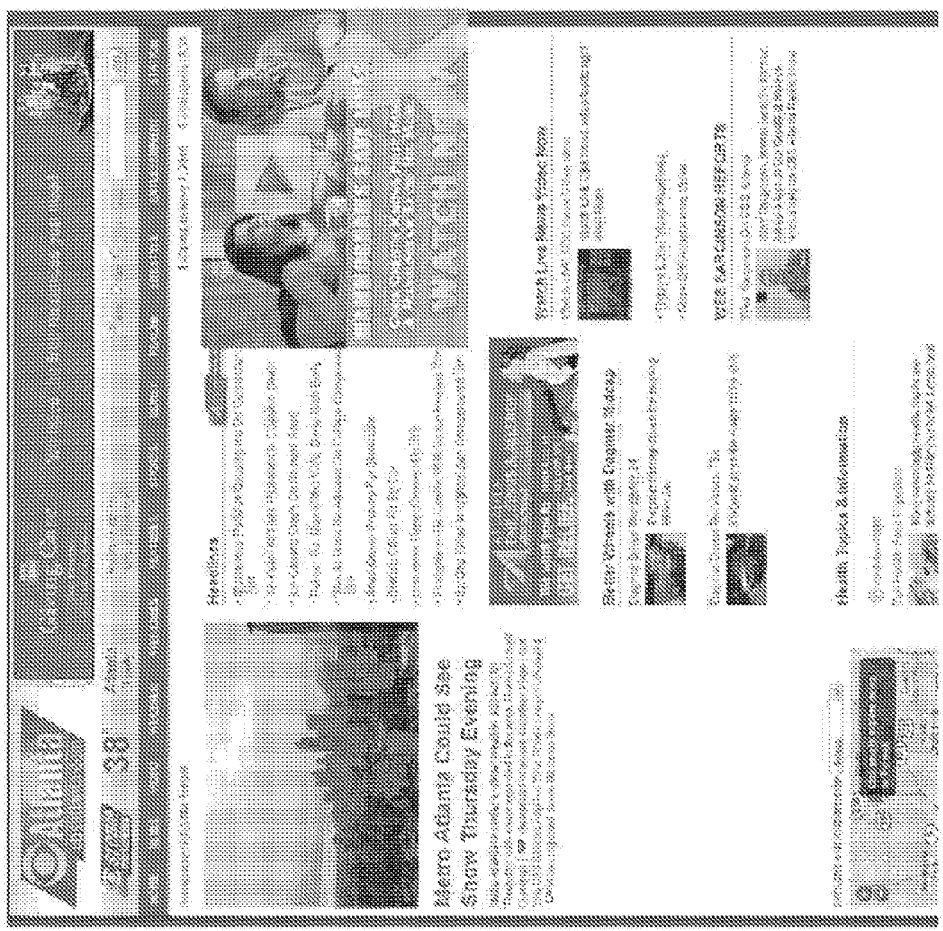
Figure 23D:
Figure 23E:
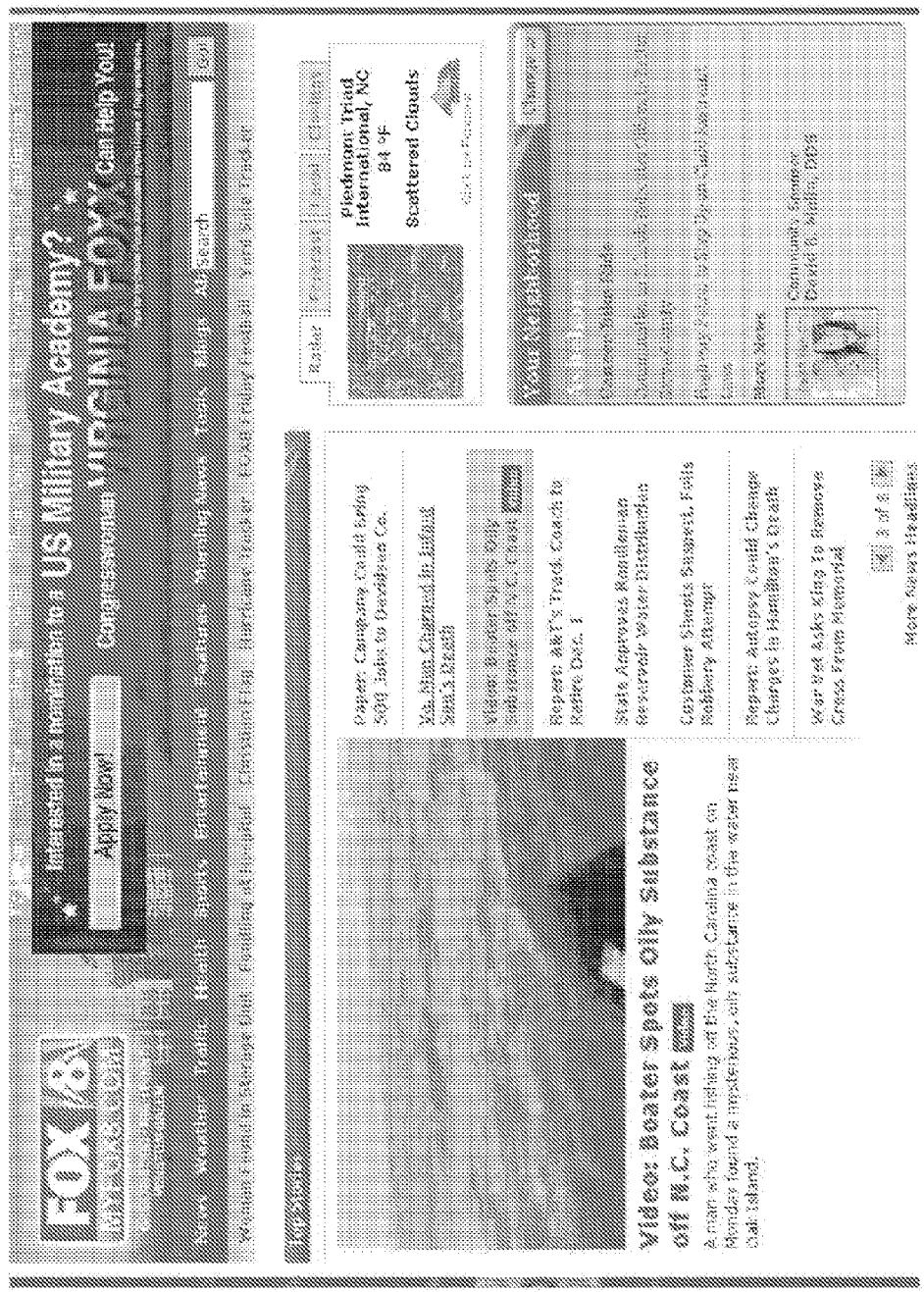
Figure 23F:
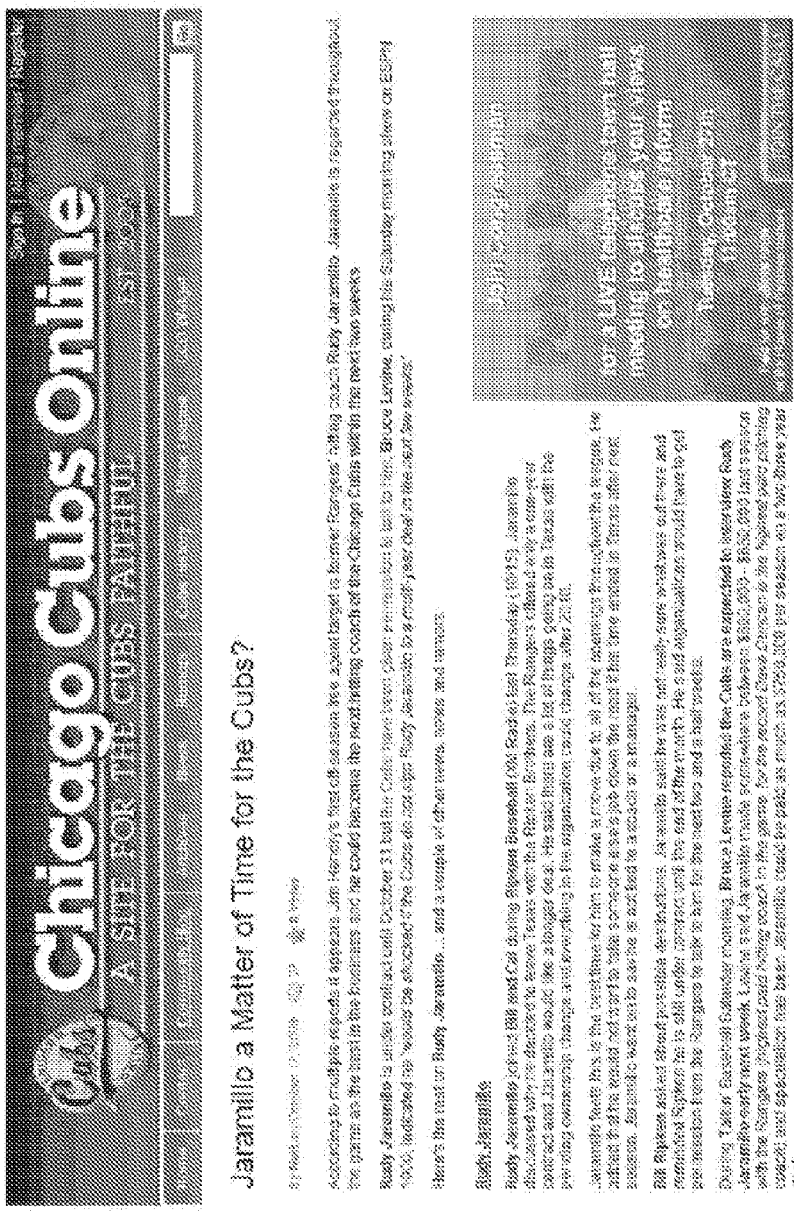

FIGS. 23A-23F show exemplary banner advertisements in context and placement of the advertisement on a web site. For example, FIG. 23A shows a contextual banner advertisement on the side of a web page advertising a candidate's position on a certain newsworthy topic. For example, FIG. 23B shows a fundraising banner advertisement on the right side of the web page of a conservative news website. For example, FIG. 23C shows an in-banner video advertisement targeted to mothers on the right side of the web page for CBSAtlanta.com Storm Tracker. For example, FIG. 23D shows a site placement advertisement placed on the Real Clear Politics site. For example, FIG. 23E shows a geo center banner advertisement for Congresswoman Foxx for military academy nominations across the top of the web page for Fox 8. For example, FIG. 23F shows a geo banner advertisement placed on the Chicago Cubs Online site inviting the viewer to join Congressman Roskam for a telephone town hall to discuss the issue of healthcare reform.

Embodiments may be used beyond displaying ad impressions on the Internet. Some embodiments are suitable for use with selectively displaying other ads, such as television commercials to targeted voters. Whereas traditional broadcast television limits tire ability to target individual viewers because content, including commercials, is broadcast to ail viewers in a cable zone or broadcast area, the present invention can work with cable systems to distribute content to individual households.

In some embodiments, the NVF content can be used by an IPTV system. IPTV allows television content to be transmitted across an IP network, such as a cable company's subscriber network to individual IP-enabled devices, such as set top boxes. IPTV can allow on-demand or live TV content to be selectively sent to individual subscribers. Content can be distributed to users via IP unicast or multicast streams. A set top box can be configured to selectively receive one or more of these streams. For instance, for on-demand content, a set top box can selectively receive a unicast stream that includes the on-demand TV show and any commercials selected to be displayed to the subscriber. The set top box can communicate with one or more content servers to request a stream in response to a user selection, such as selecting a channel or movie via a remote control. Similarly, for live TV, each channel can be transmitted as one or more multicast streams. Multiple households may view the same multicast stream or different streams, (or unicast streams). As used herein, a set top box is any devices that may access an audio or video stream and display the content to a user, such as display via a television. This may include cable boxes, videogame consoles with suitable software, digital media receivers, etc. These will be understood as examples of end-user electronic devices that can consume content and display an ad to a user of the end-user electronic device, which may be suitable for use with some embodiments.

Furthermore, in some embodiments, multiple streams may be used to create a viewing experience for a viewer. For instance, live TV may be transmitted to multiple households via a multicast stream. Then, when commercials should be displayed, the set top box may receive another multicast or unicast stream. This can allow different households viewing the same TV stream to be presented with different commercials. A Republican household may see a different ad than a Democrat household. These embodiments may identify the set top box by a unique ID or IP address that a cable/TV provider can associate with the household. This can enable the cable/TV provider to target individual households based on the subscriber's set top (or other electronic device that the subscriber uses to access video content). It should be appreciated that some embodiments may utilize non-IPTV distribution methods where a cable provider has a network suitable to selectively sending content to electronic devices (e.g. set top boxes) associated with individual households or clients.

In embodiments that have a means for selectively sending ads to households and set top boxes, the systems and methods used herein can be used to selectively target these households using the content of the voter file. Cable/TV providers can partner with entities that utilize the voter file to select households based on political demographic information. Once the households are selected using the methods described herein, the Cable TV provider can use its distribution network to serve selected ads to set top boxes (or other electronic devices) for those selected households. Similarly, the Cable TV provider receive information form the voter file that allows the provider to populate subscriber records with information from the voter file. For example, the subscriber records of cable TV provider can include entries for subscribers that contain political demographic information that corresponds to the subscriber's household. The cable TV provider can then allow advertisers to select criteria for selecting which households to target with an ad. This can include a first set of political demographic to match to subscribers. Those households matching the set of political demographic can receive the ad via one or more set top boxes during regular commercial slots or via any other advertisement method, such as banner ads displayed to a user while displaying a menu or schedule.

It should be understood that ads may be presented to users of any suitable electronic device, such as a computer accessing a website, a set top box displaying television streams to a TV, mobile phones accessing a network, and the like.

Figure 24:
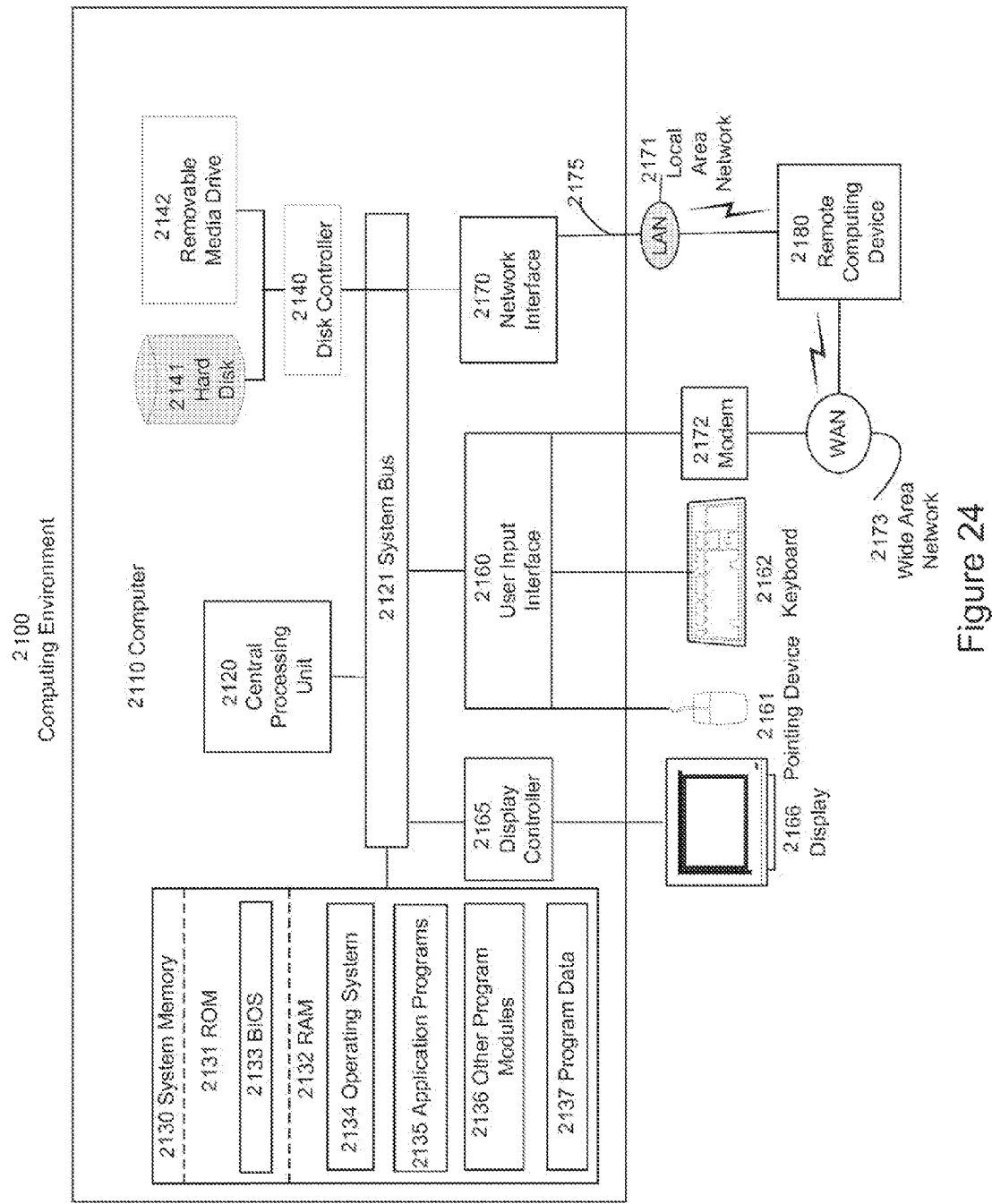
FIG. 24 is a block diagram of an example computing environment in which an example embodiment of the present invention may be implemented.

FIG. 24 illustrates an exemplary computing environment 2100 within which embodiments of the invention may be implemented. Computing environment 2100 may include computer system 2110. Computer system 2110 is one example of a general purpose computing system upon which embodiments of the invention may be implemented. Computers and computing environments, such as computer 2110 and computing environment 2100 are known to those of skill in the art and thus are described briefly here.

As shown in FIG. 24, the computing system 2110 may include a bus 2121 or other communication mechanism for communicating information, and a processor 2120 coupled with the bus 2121 for processing the information. The computing system 2101 may also include a system memory 2130 coupled to the bus 2121 for storing information and instructions to be executed by processor 2120.

The system memory 2130 may include computer storage media in the form of volatile and/or nonvolatile memory, such as read only memory (ROM) 2131 and/or random access memory (RAM) 2132. The system memory RAM 2132 may include other dynamic storage device(s) (e.g., dynamic RAM (DRAM), static RAM (SRAM), and synchronous DRAM (SDRAM). The system memory ROM 2131 may include other static storage device(s) (e.g., programmable ROM (PROM), erasable PROM (EPROM), and electrically erasable PROM (EEPROM). In addition, the main memory 2130 may be used for storing temporary variables or other intermediate information during the execution of instructions by the processor 2120.

A basic input/output system 2133 (BIOS) containing the bask routines that help to transfer information between elements within computer 2110, such as during start-up, may be stored in ROM 2131. RAM 2132 may contain data and/or program modules that are immediately accessible to and/or presently being operated on by central processing unit 2120. System memory 2130 additionally may include, for example, operating system 2134, application programs 2135, other program, modules 2136 and program, data 2137.

The computer system 2110 also includes a disk controller 2140 coupled to the bus 2121 to control one or more storage devices for storing information, and instructions, such as a magnetic hard disk 2141, a removable media drive 2142 (e.g., floppy disk drive, read-only compact disc drive, read/write compact disc drive, compact disc jukebox, tape drive, and removable magneto-optical drive). The storage devices may be added to the computer system 2110 using an appropriate device interface (e.g., a small computer system interface (SCSI), integrated device electronics (IDE), enhanced-IDE (E-IDE), direct memory access (DMA), or ultra-DMA.

The computer system 2110 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 2110 may also include a display controller 2165 coupled to the bus 121 to control a display or monitor 2165, such as a cathode ray tube (CRT) or liquid crystal display (LCD), for displaying information to a computer user. The computer system includes an input interface 2160 and one or more input devices, such as a keyboard 2161 and a pointing device 2162, for interacting with a computer user and providing information to the processor 2120. The pointing device 2162, for example, may be a mouse, a trackball, or a pointing stick for communicating direction information and command selections to the processor 120 and for controlling cursor movement on the display 2166. In addition, a printer may provide printed listings of data stored and/or generated by the computer system 2110.

The computer system 2110 may perform a portion or all of the processing steps of embodiments of the invention in response to the processor 2120 executing one or more sequences of one or more instructions contained in a memory, such as the system memory 2130. Such instructions may be read into the system memory 2130 from another computer readable medium, such as a hard disk 2141 or a removable media drive 2142. The hard disk 2141 may contain one or more datastores and data foes used by embodiments of the advertising system. Datastore contents and data files may be encrypted to improve security. One or more processors in a multi-processing arrangement may also be employed to execute the one or more sequences of instructions contained in system memory 2130. In alternative embodiments, hard-wired circuitry may be used in place of or in combination with software instructions. Thus, embodiments are not limited to any specific combination of hardware circuitry and software.

As stated above, the computer system 2110 may include at least one computer readable medium or memory for holding instructions programmed according embodiments of the invention and for containing data structures, tables, records, or other data described herein. Non-limiting examples of computer readable media include hard disks, floppy disks, tape, magneto-optical disks, PROMs (EPROM, EEPROM, flash EPROM), DRAM SRAM, SDRAM, or any other magnetic medium, compact discs (e.g., (CD-ROM), or any other optical medium, punch cards, paper tape, or other physical medium, with, patterns of holes, a carrier wave (described below), or any other medium from which a computer can read instructions.

Stored on any one or on a combination of computer readable media, embodiments of the present invention include software for controlling the computer system 2110, for driving a device or devices for implementing the invention, and for enabling the computer system 2110 to interact with a human user. Such software may include, but is not limited to, device drivers, operating systems, development tools, and applications software. Such computer readable media further comprises a computer program product for performing all or a portion (if processing is distributed) of the processing performed in implementing embodiments of the invention.

Components of the computer system 2110 which interpret one or more sequences of instructions may be any interpretable or executable code component including, but not limited to, scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 2120 for execution. A computer readable medium may take many forms including, but not limited to, non-volatile media, volatile media, and transmission media. Non-limiting examples of non-volatile media include optical, magnetic disks, and magneto-optical disks, such as hard disk 2143 or removable media drive 2142. Non-limiting examples of volatile media include dynamic memory, such as system memory 2130. Non-limiting examples of transmission media include coaxial cables, copper wire, and fiber optics, including the wires that make up the bus 2131. Transmission media may also take the form of acoustic or light waves, such as those generated during radio wave and infrared data communications.

Various teams of computer readable media may be involved m carrying out one or more sequences of one or more instructions to processor 2120 for execution. For example, the instructions may initially be carried on a magnetic disk of a remote computer. The remote computer may load the instructions for implementing all or a portion of the present invention remotely into dynamic memory and send the instructions over a telephone line using a modem. A modem local to the computer system 2110 may receive the data on the telephone line and use an infrared transmitter to convert the data to an infrared signal. An infrared detector coupled to the bus 2121 may receive the data carried in the infrared signal and place the data on the bus 2121. The bus 2121 carries the data to the system memory 2130, from which the processor 2120 may retrieve and execute the instructions. The instructions received by the system memory 2130 may optionally be stored on storage device 2141 or 2142 either before or after execution by processor 2120.

The computing environment 2100 may farther include the computer system 2120 operating in a networked environment using logical connections to one or more remote computers, such as remote computer 2180. Remote computer 2180 may be a personal computer (laptop or desktop), a mobile device, a server, a router, a network PC, a peer device or other common network node, and typically includes many or all of the elements described above relative to computer 2110. The logical connections depicted in FIG. 27 include local area network (LAN) 2171 and wide area network (WAN) 2173, but may also include other networks. Such networking environments may be common in offices, enterprise-wide computer networks, intranets, and the Internet. Communications may occur via hard wired and/or wireless means.

When used in a LAN networking environment, computer 2110 may be connected to LAN 2171 through network interface 2170. When, used in a WAN 2171 networking environment, computer 2110 may include modem 2172 for establishing communications over WAN 2173, such as the Internet. Modem 2172 may be connected to system, bus 2121 via user input interface 2160, or other appropriate mechanism.

As shown, the computer system 2110 may include a communication interlace 2175 coupled to the bus 2121. The communication interlace 2175 provides a two-way data communication coupling to a network link 2171, 2173 that is connected to, for example, a local area network (LAN) 2171, or to another communications network 2173, such as the Internet. For example, the communication interface 2175 may be a network interface card to attach to any packet witched LAN. As another example, the communication interface 2175 may be an asymmetrical digital subscriber line (ADSL) card, an integrated services digital network (ISDN) card or a modem to provide a data communication connection to a corresponding type of communications line. Wireless links may also be implemented, in any such implementation, the communication interface 2175 sends and receives electrical, electromagnetic, or optical signals that carry digital data streams representing various types of information.

Computer 2110 or other client device can be deployed as part of a computer network. In this regard, various embodiments-pertain to any computer system having any number of memory or storage units, and any number of applications and processes occurring across any number of storage units or volumes. An embodiment may apply to an environment with server computers and client computers deployed in a network environment, having remote or local storage. An embodiment may also apply to a standalone computing device, having programming language functionality, interpretation and execution capabilities.

As described herein, the various systems, subsystems, agents, managers, and processes can be implemented using hardware components, software components, and/or combinations thereof.

The World Wide Web, commonly referred to as the Web, is a system of interlinked hypertext documents accessed via the Internet. With a web browser, one can view web pages that may contain text, images, videos, text over video, and other multimedia and navigate between them by using hyperlinks. The terms Internet and World Wide Web are often used in every-day speech without much distinction. However, the internet and the World Wide Web are not one and the same. The Internet is a global system of interconnected computer networks, while the Web is one of the services that run on the Internet. The web is a collection of interconnected documents and other resources, linked by hyperlinks and URLs. As such, the Web is an application running on the Internet. Viewing a web page on the World Wide Web normally begins either by typing the URL of the page into a web browser, or by following a hyperlink to that page or resource. The web browser then initiates a series of communication messages, behind the scenes, in order to fetch and display it.

For example, the server-name portion of the URL is resolved into an IP address using the global, distributed Internet database known as the Domain Name System (DNS). This IP address is necessary to contact the Web server. The browser then requests the resource by sending an HTTP request to the Web server at that particular address. In the case of a typical web page, the HTML, text of the page is requested first and parsed immediately by the web browser, which then makes additional requests for images and any other files that complete the page image.

While receiving these files from the web server, browsers may progressively render the page onto the semen ax specified by its HTML, Cascading Style Sheets (CSS), or other page composition languages. Any images and other resources are incorporated to produce the on-screen web page that the user sees. Most web pages contain hyperlinks to other related pages and perhaps to downloadable files, source documents, definitions and other web resources. Such a collection of useful, related resources, interconnected via hypertext links is dubbed a web of information.

Embodiments of the present invention may provide the ability to allow and facilitate targeting of online political advertisements. The present inventions allows candidates and PACs to communicate rapidly and regularly with registered voters, or segments of voters.

The rise of mass media, particularly television media, has given the incumbents a comparative advantage over PACs and newcomers in communicating with the people. While incumbents can employ the resources of franking and press coverage, newcomers often lack the institutional resources to compete with incumbents. The present invention may be appropriate for use by candidates and causes. Candidates are people running for or seeking political office. Causes may take various forms, such ax for example, advocacy groups, such, as PACs, non-profits, environmental groups, public affairs, commercial clients, lobbying groups, and the like.

Although the invention has been described with reference to exemplary embodiments, it is not limited thereto. For example, while the person surfing, the web in many of these examples is presumed to be a voter, other types of users can be used in these examples. While the demographic information is described with an emphasis on political information, other demographic information may be used in certain embodiments. Those skilled in the an will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A method for targeting messages to voters comprising the steps of: receiving a plurality of first records for a first group of voters, each including political demographic information associated with a first voter; determining the likely identity of the first voter browsing a first website; creating a cookie that correlates a browser of the first voter to at least a subset of the political demographic information associated with the first voter using a processor; sending the cookie to the browser of the first voter across the internet, wherein the cookie is configured to allow subsequent association of the political demographic information with the browser at a second website.

2. The method of claim 1, further comprising the steps of causing an advertisement to be transmitted to the browser when the cookie is detected at the second website; determining if the political demographic information associated with the cookie matches a selected demographic criteria to determine whether to bid on an advertisement impression; creating a record of the cookie in a second group of records that can be shared with other partners to determine which browsers correspond to selected demographic criteria; wherein
a unique identifier of the cookie cannot be used to determine the identity of the first voter;
the subset of the political demographic information includes a political party associated with the first voter; and
the political demographic information includes at least one voting district associated with the first voter.

3. A system for displaying a plurality of messages to potential voters comprising:
a data mining provider computer system receiving information from a first browser that includes a first cookie identifier, associated with a first cookie, that correlates a first user set of political demographic information associated with a likely identity of a first user of the first browser with the first browser;
the data mining provider computer system receiving a first target set of political demographic information that includes information for targeting advertisements to potential voters;
the data mining provider computer system comparing the first user and first target sets of political demographic information to determine a first dataset of responsive cookies that match the first target set of political demographic criteria;
the data mining provider computer system transmitting the first dataset of responsive cookies to a digital service provider computer system;
the digital service provider computer system receiving a first request to serve an advertisement impression; and
the digital service provider computer system requesting, automatically using a processor, display of a first ad impression to the first browser if at least one of the first cookies is among the first dataset of responsive cookies.

4. The system of claim 3, wherein the first target set of political demographic information includes at least one political district.

5. The system of claim 3, wherein the first user set of political demographic information includes at least at a political party associated with the likely identity of the first user.

6. The system of claim 5, further comprising the digital service provider computer system automatically
generating, using the processor, a bid for the right to display the first ad impression, and
sending the bid to an advertisement exchange.

7. The system of claim 3 further comprising
the data mining provider computer system receiving information from a second browser that includes at least one second cookie identifier, associated with a second cookie, that correlates a second user set of political demographic information associated with a likely identity of a second user of the second browser with the second browser;
the data mining provider computer system receiving a second target set of political demographic information that includes information for targeting advertisements to potential voters;
the data mining provider computer system
comparing
both
the first user set of political demographic information and the second user set of political demographic information
to both
the first target set of political demographic information and
the second target set of political demographic information, and
determining both
the first dataset of responsive cookies that match the first target set of political demographic criteria and
a second dataset of responsive cookies that match the second target set of political demographic criteria;
the data mining provider computer system transmitting both the first dataset of responsive cookies and the second dataset of responsive cookies to the digital service provider computer system; and
the digital service provider computer system bidding, automatically using the processor,
a first amount to display a second ad impression to the first browser if the first cookie is among the first dataset of response cookies, and
a second amount to display a third ad impression to the second browser if the second cookie is among the second dataset of response cookies.

8. The system of claim 7 wherein
the first target set of political demographic information is associated with registered Republicans;
the second set of political demographic information is associated with registered Democrats;
the second ad impression is selected from a Republican ad set,
the third ad impression is selected from a Democratic ad set, and
the Republican ad set does not include the third ad impression.

9. The system of claim 8 wherein
the first amount is unequal to the second amount; and
both the Republican ad set and the Democratic ad set include the first ad impression.

10. The system of claim 7 wherein
the first user set of political demographic information comprises information from voter registration records associated with the likely identity of the first user, and
the second user set of political demographic information comprises information from census data associated with the likely identity of the second user.

11. The system of claim 10 wherein
neither the first dataset nor the second dataset includes the likely identities of either the first user or the second user.

12. The system of claim 7 further comprising
the digital service provider computer system bidding, automatically using the processor,
a third amount to display a third ad impression to the second browser if
the second cookie is among the second dataset of response cookies and
the second cookie is among the first dataset of response cookies; and further
wherein the third amount is greater than the second amount.

13. A non-volatile computer readable medium having stored therein a plurality of instructions for targeting a message to selected potential voters comprising and
for causing one or more processors on a network device to execute the steps of:
providing an electronic map interface configured to allow a user to select political demographic criteria to define a target group of voters;
transmitting instructions to a data mining provider computer system to determine a subset of registered voters in a database, the subset of registered voters defining a part of the target group;
selecting a message to display to the subset of voters; and
transmitting instructions to a digital service provider computer system to automatically request electronic display of the message to users of a group of electronic devices who have a likely identity of one of the voters in the subset of voters.

14. The computer readable medium of claim 13, wherein the step of transmitting instructions to the digital service provider computer system to automatically request electronic display of a message comprises requesting display of an advertisement to a subset of cable, IPTV, mobile or satellite TV subscribers whose household includes at least one member that is in the subset of voters.

15. The computer readable medium of claim 13, wherein the step of transmitting instructions to the digital service provider computer system to automatically request electronic display of the message comprises bidding on ad impressions to be displayed on an electronic device associated with at least one member that is in the subset of voters.

16. The computer readable medium of claim 13, wherein the step transmitting instructions to the digital service provider computer system to automatically request electronic display of the message comprises requesting display of the message as an ad impression on an electronic device, which is coupled to a cable, satellite or mobile network and associated with at least one member that is in the subset of voters.

17. The computer readable medium of claim 13, wherein a user of a browser on one of the group of electronic devices is identified as matching-selected demographic criteria based on at least one tracking cookie placed on the browser.

18. The computer readable medium of claim 13, wherein the electronic map interface allows a user to select the political party affiliation of voters to target with the message.

19. The computer readable medium of claim 13, wherein the electronic map interface allows a user to select at least one electoral criterion, voting geography and associated media network geographies.

20. A system for targeting a message to selected potential voters comprising:
an advertising computer system receiving a request for displaying one or more advertisements to a group of individuals, the request including selected political demographic criteria to define the group;
a data mining provider computer system determining, via a processor, a subset of electronic records of a database that match the selected political demographic criteria;
a digital service provider computer system identifying at least one electronic device associated with the subset of electronic records; and
the digital service provider computer system transmitting the one or more advertisements to the electronic device.

21. The system of claim 20, further comprising
the digital service provider computer system bidding on an ad exchange for ad impressions associated with a browser running on the electronic device; and
the database includes Internet Protocol addresses.

22. The system of claim 21 wherein
the database further includes
latitude and longitude coordinates, and postal addresses correlated with the Internet Protocol addresses.

23. The system of claim 20, wherein
a cable provider operates the digital service provider computer system and the electronic device is associated with at least one cable subscriber.

24. The system of claim 23 further comprising
the digital service provider computer system bidding on an ad exchange for ad impressions associated with the electronic device.

25. The system of claim 20, wherein the electronic device is a set top box associated with at least one household and is configured to display live TV to viewers in the household.

* * * * *